US006675758B2

(12) United States Patent
Nagata et al.

(10) Patent No.: US 6,675,758 B2
(45) Date of Patent: Jan. 13, 2004

(54) ROTATION CONTROL APPARATUS FOR INTERNAL COMBUSTION ENGINE

(75) Inventors: Tsutomu Nagata, Torrance, CA (US); Kiyoo Hirose, Nagoya (JP); Kenji Itagaki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 164 days.

(21) Appl. No.: 09/987,093

(22) Filed: Nov. 13, 2001

(65) Prior Publication Data
US 2002/0056440 A1 May 16, 2002

(30) Foreign Application Priority Data

Nov. 15, 2000 (JP) .................... 2000-348078
Jan. 17, 2001 (JP) .................... 2001-009409
Apr. 26, 2001 (JP) .................... 2001-129234

(51) Int. Cl.[7] ................................ F02B 75/06
(52) U.S. Cl. .................... 123/192.1; 123/436
(58) Field of Search .............. 123/192.1, 179.4, 123/436, 481; 180/65.2, 65.3, 65.1

(56) References Cited

U.S. PATENT DOCUMENTS

| 5,319,921 A | 6/1994 | Gopp |
| 5,492,190 A | 2/1996 | Yoshida |
| 5,566,774 A | 10/1996 | Yoshida |
| 5,632,238 A * | 5/1997 | Furukawa et al. ........ 123/179.3 |
| 5,801,499 A * | 9/1998 | Tsuzuki et al. .............. 318/141 |
| 5,862,497 A | 1/1999 | Yano et al. |
| 6,102,144 A * | 8/2000 | Lutz .......................... 180/65.2 |
| 6,131,538 A | 10/2000 | Kanai |
| 6,138,784 A | 10/2000 | Oshima et al. |
| 6,176,807 B1 * | 1/2001 | Oba et al. ...................... 477/5 |
| 6,283,079 B1 * | 9/2001 | Cumming et al. ........ 123/192.1 |
| 6,443,126 B1 * | 9/2002 | Morimoto et al. ..... 123/339.15 |

FOREIGN PATENT DOCUMENTS

| JP | 09-039613 | 2/1997 |
| JP | 10-288063 | 10/1998 |
| JP | 10-339182 | 12/1998 |
| JP | 11-153047 | 6/1999 |

* cited by examiner

Primary Examiner—Mahmoud Gimie
(74) Attorney, Agent, or Firm—Kenyon & Kenyon

(57) ABSTRACT

A control apparatus for suppressing vibrations of an engine when combustion is stopped. The control apparatus maintains an engine rotational speed at a reference rotational speed for a reference time when the combustion of the engine is automatically stopped. This results in a reduction in pressure in a combustion chamber of the engine. The control apparatus gradually reduces the rotational speed of the crankshaft, and stops the crankshaft before the rotational speed of the crankshaft reaches a resonant speed. In this way, the resonance and increased pressure in the combustion chamber are prevented to reduce vibrations of the vehicle.

43 Claims, 17 Drawing Sheets

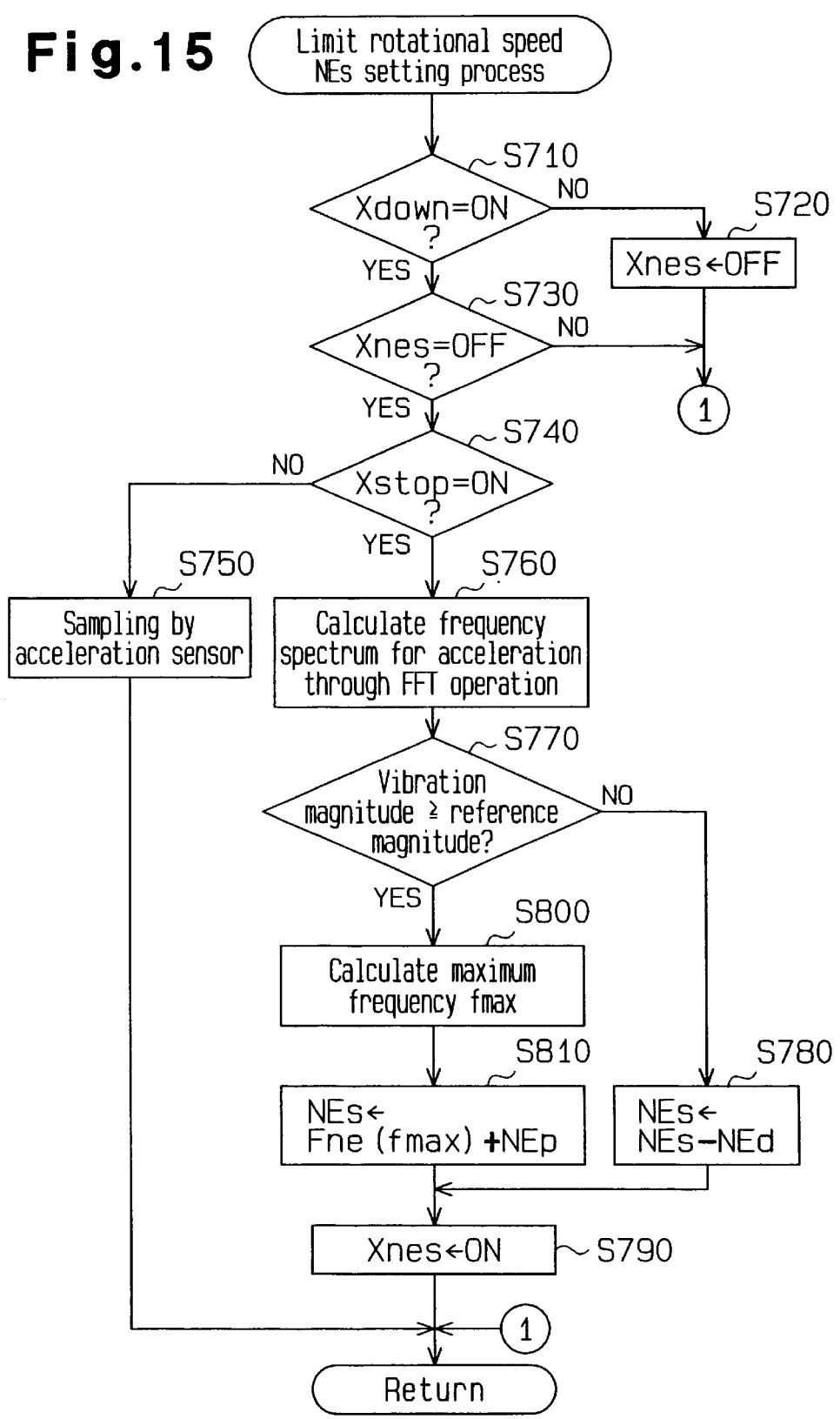

ROTATION CONTROL APPARATUS FOR INTERNAL COMBUSTION ENGINE

BACKGROUND OF THE INVENTION

The present invention relates to an apparatus for controlling the rotation of an internal combustion engine.

A conventional automobile is equipped with an economy running system for improving the fuel efficiency of an internal combustion engine. The economy running system automatically stops the combustion of the internal combustion engine when the automobile is temporarily stopped at an intersection or the like. When the automobile is started again, the economy running system rotates a motor to start the internal combustion engine.

However, vibrations are generated in an automatic combustion stopping process for the internal combustion engine. The vibrations may be caused, for example, by fluctuations in torque of the internal combustion engine, or a sudden decrease in creep force. Since the automatic combustion stoppage is not intended by a driver, the driver may feel discomfort with the vibrations.

An internal combustion engine control apparatus disclosed in Laid-open Japanese Patent Application No. Hei 10-339182 maintains the rotation of an internal combustion engine with a second electric motor when a fuel is cut during deceleration of a vehicle. After the vehicle speed has been reduced to zero, the control apparatus stops the second electric motor and drives a first electric motor to prevent a difference in creep force from occurring. However, the creep force may vary to cause vibrations unless either of the two electric motors is kept driving even during stoppage of combustion of the internal combustion engine.

BRIEF SUMMARY OF THE INVENTION

It is an object of the present invention to provide a control apparatus for reducing vibrations when the operation of an internal combustion engine is stopped.

To achieve the above object, the first aspect of the present invention provides a rotation control apparatus for controlling internal combustion engine rotating means for driving an internal combustion engine to control rotation of a rotating shaft of the internal combustion engine. The rotation control apparatus includes an ECU for reducing vibrations of the engine. The ECU maintains a rotational speed of the internal combustion engine at a reference rotational speed to reduce an air pressure in a cylinder of the internal combustion engine when an operation of the internal combustion engine is stopped, and subsequently stops rotation of the engine.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 15 is a flow chart illustrating a limit rotational speed (NEs) setting process according to a fourth embodiment;

DETAILED DESCRIPTION OF THE PREFERRED EMBODIMENTS

First Embodiment

Figure 1:
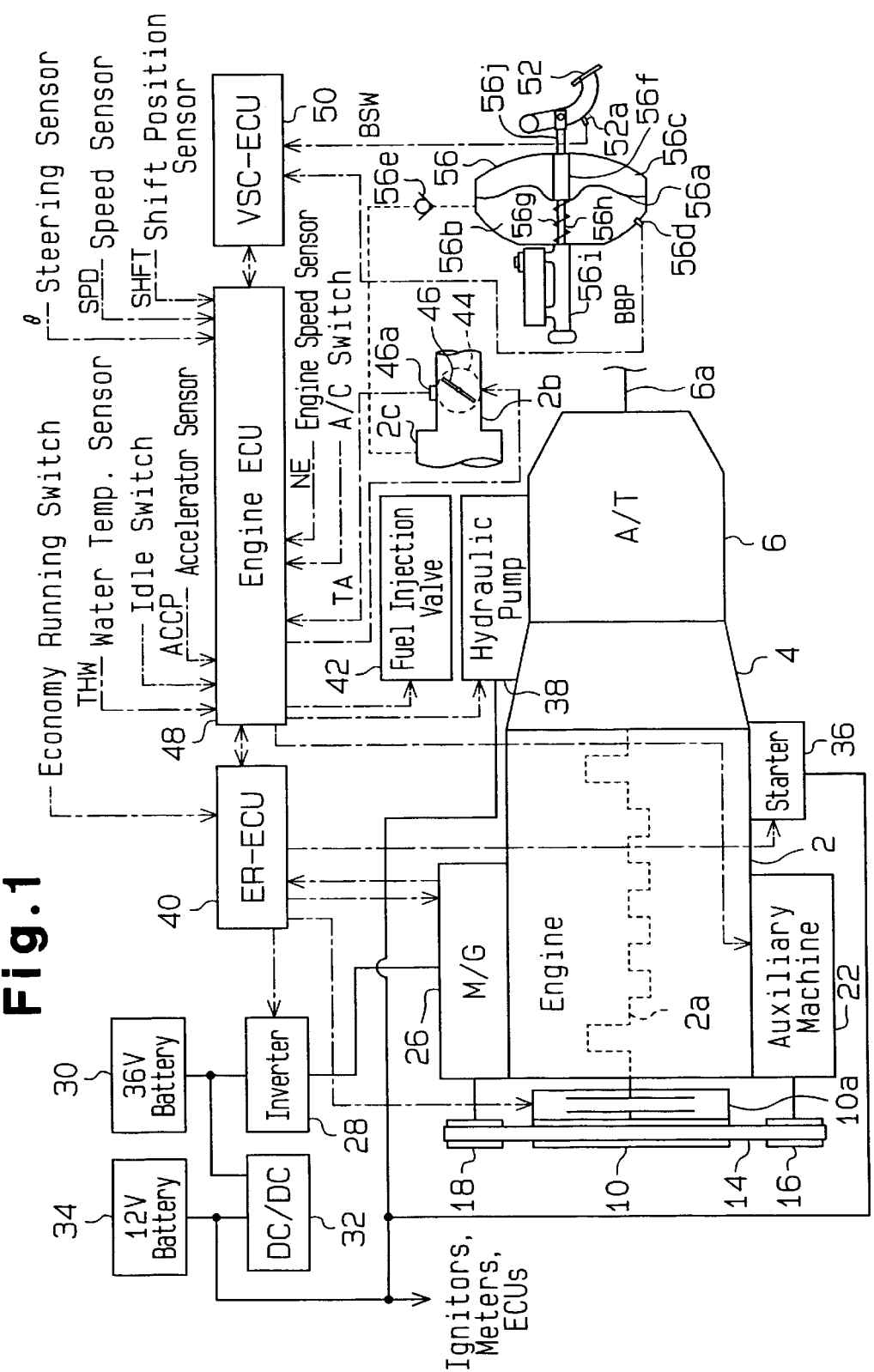
FIG. 1 is a schematic diagram of an internal combustion engine for vehicle and a control apparatus therefor according to a first embodiment of the present invention.

An internal combustion engine 2 for vehicle, and a control apparatus therefor, according to a first embodiment of the present invention, will be described with reference to FIG. 1. The internal combustion engine 2 in the first embodiment is a gasoline engine 2.

The engine 2 has two driving force transmission systems. Specifically, the engine 2 has a crankshaft 2a connected to a torque converter 4 and an output pulley 10. In a first driving force transmission system, a driving force of the engine 2 is transmitted to wheels (not shown) through the crankshaft 2a of the engine 2, a torque converter 4, an automatic transmission (A/T) 6, and an output shaft 6a. In a second driving force transmission system, the driving force of the engine 2 is transmitted to an auxiliary pulley 16 and an M/G pulley 18 through the output pulley 10 and a belt 14. An electromagnetic clutch 10a controlled by an economy running electronic control unit (ER-ECU) 40 is located between the output pulley 10 and the crankshaft 2a. As the electromagnetic clutch 10a is turned on, the output pulley 10 is connected to the crankshaft 2a.

A rotating shaft of an auxiliary machine 22 is operatively coupled to the auxiliary pulley 16. The auxiliary machine 22 may be, for example, a compressor for air conditioning, a power steering pump, or a water pump for cooling the engine. It should be noted that while one auxiliary machine 22 is illustrated in FIG. 1, a plurality of auxiliary machines 22 may be operatively coupled to the auxiliary pulley 16.

The M/G pulley 18 is connected to a motor generator (M/G) 26. The M/G 26 may be operated in a generation or a regeneration mode, and a driving mode. In the generation or regeneration mode, the M/G 26 acts as a generator for converting the rotation of the engine 2 into electric energy. In the driving mode, on the other hand, the M/G 26 acts as a motor for rotating one or both of the engine 2 and auxiliary machine 22 through the M/G pulley 18. The M/G 26 and the electromagnetic clutch 10a act as an internal combustion engine rotating means.

The M/G 26 is electrically connected to an inverter 28. When the M/G 26 is operated in the generation or regeneration mode, the inverter 28 charges electric energy in a battery 30 for high voltage power supply (here, 36 V) from the M/G 26, or charges electric energy in a battery 34 for low voltage power supply (here, 12 V) through a DC/DC converter 32. The M/G 26 also powers an ignition system, meters, and each of electronic control units (ECU) 40, 48, 50.

When the M/G 26 is operated in the driving mode, the inverter 28 powers the M/G 26 from the high voltage battery 30 to drive the M/G 26. In this way, the M/G 26 drives the auxiliary machines 22 while the engine 2 is stopped. On the other hand, the M/G 26 rotates the crankshaft 2a when the engine 2 is controlled in an automatic start mode, an automatic combustion stop mode, or a vehicle launch mode. The inverter 28 adjusts the rotational speed of the M/G 26 by regulating the amount of electric energy supplied from the high voltage battery 30.

The low voltage battery 34 is connected to a starter motor 36 for starting the engine in a cold state. The starter motor 36, powered by the low voltage battery 34, rotates a ring gear to start the engine 2.

The low voltage battery 34 powers an electric hydraulic pump 38 for supplying a hydraulic fluid to a hydraulic controller within the A/T 6. The electric hydraulic pump 38 drives a control valve within the hydraulic controller to adjust the performance of a clutch, brake, and one-way clutch within the A/T 6 to switch a shift position.

The electromagnetic clutch 10a, M/G 26, inverter 28, starter motor 36, and the amount of charges accumulated in batteries 30, 34 are controlled by the ER-ECU 40. The auxiliary machine 22 except for the water pump, electric hydraulic pump 38, A/T 6, fuel injection valve (intake port injection type or an intra-cylinder injection type) 42, and electric motor 44 for driving a throttle valve 46 located in an intake pipe 2b are controlled by the engine ECU 48. A VSC (vehicle stability control) -ECU 50 controls a brake of each wheel.

The ER-ECU 40 detects the rotational speed of the rotating shaft of the M/G 26 from a rotational speed sensor built in the M/G 26, and detects a start of the economy running system from a manipulation of the driver who has turned on an economy running switch. The engine ECU 48 in turn detects engine control parameters such as an engine cooling water temperature THW from a water temperature sensor; a trodden accelerator pedal from an idle switch; an accelerator opening ACCP from an accelerator opening sensor; a steering angle θ of a steering wheel from a steering angle sensor; a vehicle speed SPD from a vehicle speed sensor; a throttle opening TA from a throttle opening sensor 46a; a shift position SHFT from a shift position sensor; an engine rotational speed NE from an engine rotational speed sensor; and air conditioning operation from an air conditioning switch.

The VSC-ECU 50 is connected to a brake switch 52a mounted on a brake pedal 52 to detect a signal BSW indicative of the amount of treading on the brake pedal 52 for braking control. Specifically, the VSC-ECU 50 is supplied with the treading amount signal BSW set to off when the brake pedal 52 is not being trodden, while the VSC-ECU 50 is supplied with the treading amount signal BSW set to on when the brake pedal 52 is being trodden.

A brake booster 56 is a booster for increasing a treading force on the brake pedal 52. The brake booster 56 has a first and a second pressure chamber 56b, 56c defined by a diaphragm 56a. A brake booster pressure sensor 56d located in the first pressure chamber 56b detects a brake booster pressure within the first pressure chamber 56b to supply the VSC-ECU 50 with a brake booster pressure signal BBP. The first pressure chamber 56b is supplied with an intake negative pressure from a surge tank 2c through a check valve 56e. The check valve 56e allows an air flow from the first pressure chamber 56b to the surge tank 2c, and prevents the opposite flow.

The brake booster 56 will be described in detail. When the brake pedal 52 is not being trodden, a negative pressure within the first pressure chamber 56b is introduced into the second pressure chamber 56c through a negative pressure control valve 56f located in the brake booster 56. This causes the pressures in the first pressure chamber 56b and in the second pressure chamber 56c to be the same negative pressure. Since the diaphragm 56a is pushed back toward the brake pedal 52 by a spring 56g, a push rod 56h associated with the diaphragm 56a will not push a piston (not shown) within a master cylinder 56i.

On the other hand, as the brake pedal 52 is trodden, a negative pressure control valve 56f, associated with an input rod 56j arranged on the brake pedal 52, blocks between the first pressure chamber 56b and the second pressure chamber 56c, and the atmosphere is introduced into the second pressure chamber 56c. This results in a pressure difference between the first pressure chamber 56b at a negative pressure and the second pressure chamber 56c substantially at the atmospheric pressure. Thus, a threading force acting on the brake pedal 52 is boosted, causing the diaphragm 56a to push the push rod 56h into the master cylinder 56i against an urging force of a spring 56g. In this way, a piston within the master cylinder 56i is pushed to perform a braking operation.

As the brake pedal 52 is returned, the negative pressure valve 56f, associated with the input rod 56j, blocks the second pressure chamber 56c from the exterior and communicates the first pressure chamber 56b with the second pressure chamber 56c. An intake negative pressure is introduced from the first pressure chamber 56b into the second pressure chamber 56c so that the first pressure chamber 56b is at the same pressure as the second pressure chamber 56c. Therefore, the diaphragm 56a is moved toward the brake pedal 52 by the urging force of the spring 56g to return to the original position.

Each of the ECUs 40, 48, 50 comprises a microcomputer which includes a CPU, a ROM and a RAM. The CPU performs processing in accordance with a program written in the ROM to execute a variety of controls based on the result of processing. The result of processing and detected data used in the processing are exchanged between the ECUs 40, 48, 50. The ECUs 40, 48, 50 interact with one another to execute their controls.

Next, a vehicle driving control executed by the ER-ECU 40 will be described. In a variety of controls described below, an automatic combustion stopping process and an automatic combustion starting process are executed when the driver switches on the economy running switch.

Figure 2:
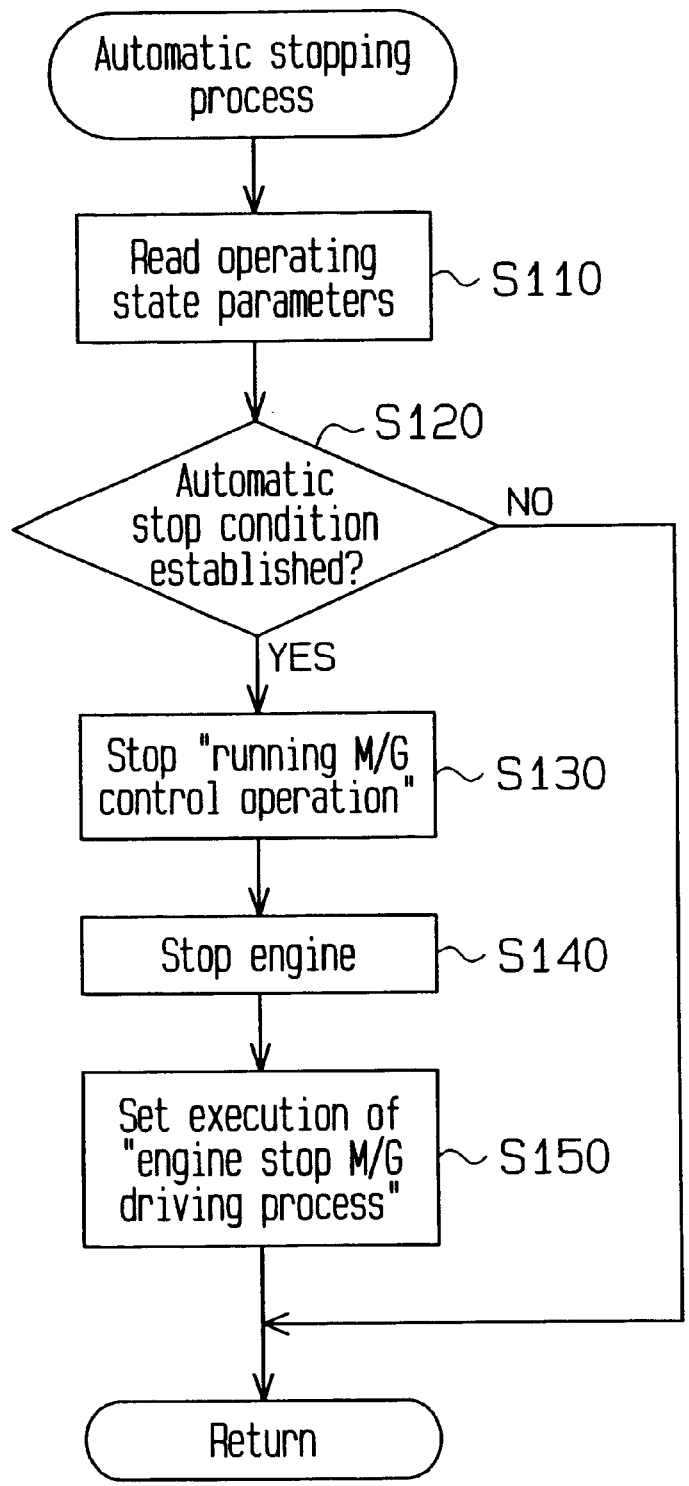
FIG. 2 is a flow chart illustrating an automatic combustion stopping process.

The automatic combustion stopping process is illustrated in a flow chart of FIG. 2. This process is repeatedly executed at a relatively short cycle.

In the automatic combustion stopping process, the ER-ECU 40 first reads operating state parameters for determining execution conditions (S110). Specifically, ER-ECU 40 reads into its RAM the engine cooling water temperature THW, accelerator opening ACCP, voltages of batteries 30, 34, treading amount signal BSW of the brake pedal 52, and vehicle speed SPD.

Next, the ER-ECU 40 determines from the operating condition parameters whether or not an automatic combustion stop condition is established (S120). The automatic combustion stop condition is established, for example, when the following conditions (1)–(5) are all satisfied.

(1) The engine 2 has been warmed up and is not overheated (the engine cooling water temperature THW is within a range between predetermined upper limit and lower limit values).

(2) The accelerator pedal is not being trodden down (the idle switch is on).

(3) The amounts of charge in the batteries 30, 34 have reached respective required levels.

(4) The brake pedal 52 is being trodden down (the brake pedal 52a is on).

(5) The vehicle is stopped (the vehicle speed SPD is 0 km/h).

If even one of the conditions (1)–(5) is not satisfied, the automatic combustion stop condition is not established (NO at S120), and then this process is once terminated.

On the other hand, when the automobile is stopped at an intersection, for example, to establish the automatic combustion stop condition (YES at S120), the ER-ECU 40 stops a running mode M/G control operation (S130). The running mode M/G control operation is executed in the automatic combustion starting process of FIG. 5. Specifically, the running mode M/G control operation instructs the M/G 26 to operate in a generation mode during a normal running state. On the other hand, when a fuel is cut during vehicle deceleration, the running mode M/G control operation instructs the M/G 26 to operate in the regeneration mode to recover running energy. Further, immediately after completion of fuel cut, the running mode M/G control operation instructs the M/G 26 to operate in the driving mode to assist the rotation of the engine 2.

Next, the ER-ECU 40 performs an engine stopping operation (S140). Specifically, ER-ECU 40 instructs the engine ECU 48 to cut the fuel. Thus, the fuel injection from the fuel injection valve 42 is stopped, and the throttle valve 46 is fully closed to stop the combustion.

Figure 3:
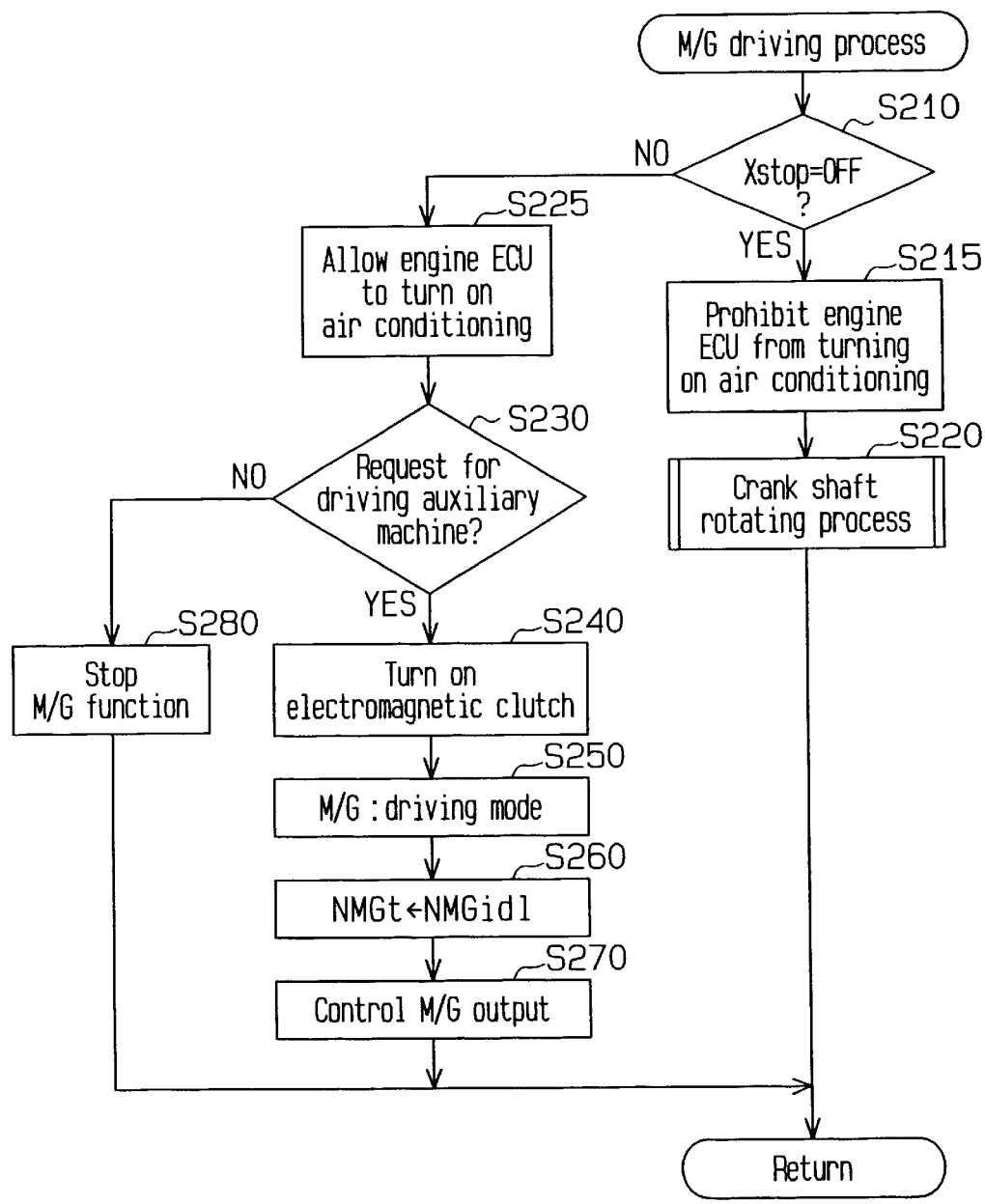
FIG. 3 is a flow chart illustrating an engine driving process during stoppage of combustion using a motor generator.

At S150, the ER-ECU 40 executes a combustion stop mode M/G driving process in FIG. 3. Thus, the automatic stopping process is once terminated.

The combustion stop mode M/G driving process will be described with reference to FIG. 3. This process starts at step S150, and is repeatedly executed at a short cycle.

In the combustion stop mode M/G driving process, the ER-ECU 40 first determines whether or not a vibration reducing operation end flag Xstop is OFF (S210). The vibration reducing operation end flag Xstop is set to OFF when the ER-ECU 40 is powered on, and when the automatic start condition is established in the automatic combustion starting process in FIG. 5.

Therefore, since Xstop is OFF in the first loop (YES at S210), the ER-ECU 40 instructs the engine ECU 48 to prohibit the air conditioning from being turned on (S215). If the air conditioning has been turned on, the engine ECU 48 disconnects the air conditioning compressor 22 from the auxiliary pulley 16 to stop the air conditioning.

Figure 4:
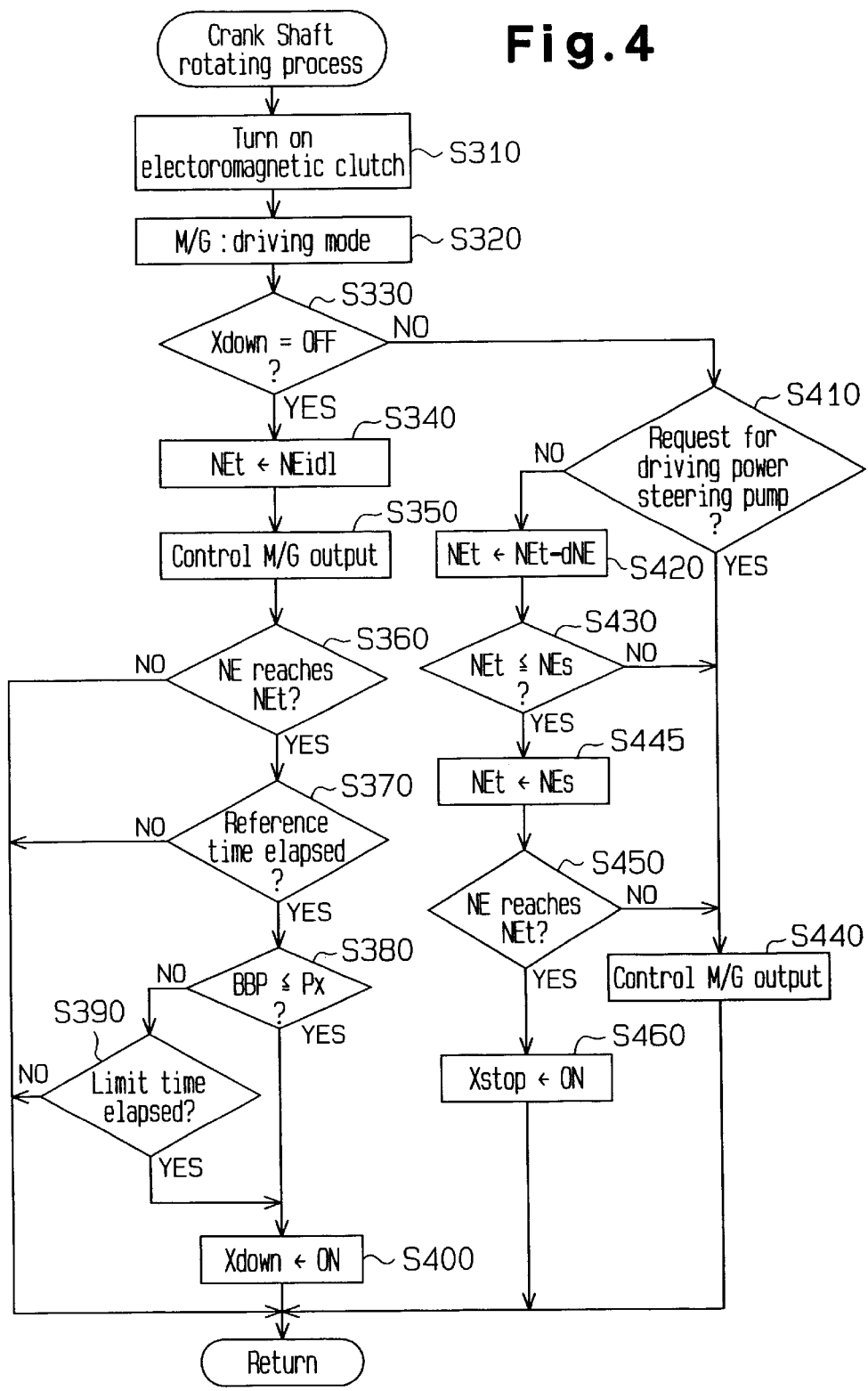
FIG. 4 is a flow chart illustrating a crankshaft rotating process.

At S220, the ER-ECU 40 executes a crankshaft rotating process illustrated in FIG. 4.

In the crankshaft rotating process, the electromagnetic clutch 10a is turned on (S310), and the M/G 26 is driven in the driving mode (S320). If the electromagnetic clutch 10a has been turned on, the electromagnetic clutch 10a is kept on in the operation at step S310. This is applied to other operations which involve turning the electromagnetic clutch 10a on.

The ER-ECU 40 determines whether or not a rotational speed decrease start flag Xdown is OFF (S330). The rotational speed decrease start flag Xdown is set to OFF when the ER-ECU 40 is powered on.

Therefore, since Xdown is OFF in the first loop, the ER-ECU 40 determines YES at S330. Next, the ER-ECU 40 sets an idle target rotational speed NEidl (for example, 600 rpm) as a target rotational speed NEt for the engine 2 (S340). With this setting, the ER-ECU 40 controls the output of the M/G 26 using the inverter 28 such that the engine rotational speed NE reaches the target rotational speed NEt (S350). Specifically, the M/G 26 rotates the crankshaft 2a of the engine 2 through the M/G pulley 18, belt 14 and output pulley 10 to maintain the engine 2 at a rotational speed equivalent to idling rotation.

Next, the ER-ECU 40 determines whether or not the detected engine rotational speed NE has reached the target rotational speed NEt (S360). The ER-ECU 40 determines NO at S360 if the engine rotational speed NE has not reached the target rotational speed NEt, and then this process is once terminated.

Subsequently, the output of the M/G 26 is controlled by repetitions of steps S340, S350 such that the engine rotational speed NE reaches the target rotational speed NEt. Once the engine rotational speed NE has reached the target rotational speed NEt (YES at S360), the ER-ECU 40 next determines whether or not a predetermined reference time had elapsed from the time the engine rotational speed NE reached the target rotational speed NEt (S370). The reference time may be, for example, 0.5 seconds. Steps S340, S350 are repeated until the reference time has elapsed (NO at S370).

If the reference time is exceeded by a time during which the engine 2 is driven by the M/G 26 to maintain the rotational speed at the idling rotation level, the ER-ECU 40 determines YES at S370. The ER-ECU 40 determines at S380 whether or not a brake booster pressure BBP is reduced to a reference pressure Px or lower. The reference pressure Px is set at such a pressure to which the brake booster 56 sufficiently boosts a brake treading force even when the brake pedal 52 is trodden again immediately after the engine is stopped.

If BBP>Px, the ER-ECU 40 determines NO at S380. The ER-ECU 40 determines at S390 whether or not a limit time had elapsed from the time the engine rotational speed NE reached the target rotational speed NEt. This limit time may be, for example, 3 seconds. The ER-ECU 40 determines NO at S390 until the limit time has elapsed, causing steps S340, S350 to be repeated. If BBP$\leq$Px, the ER-ECU 40 determines YES at S390. At S400, the rotational speed decrease start flag Xdown is set to ON, and then this process is once terminated.

If BBP$\leq$Px had already been established (YES at S380) at the time the reference time elapsed (YES at S370), the rotational speed decrease start flag Xdown is set to ON (S400), and then this process is once terminated.

The reference time should be a sufficiently long time for the M/G 26 to rotate the crankshaft 2$a$ with the fully closed throttle valve 46 to reduce an air pressure within an engine cylinder to a predetermined value. While the reference time depends on the type of engine and also on the magnitude of electric load applied by the auxiliary machine such as the air conditioning compressor, the reference time is set to a sufficiently long time to reduce the air pressure to such a level at which it can be ensured that the vibrations are prevented.

On the other hand, the limit time is provided for avoiding the consumption of the charge accumulated in the high voltage battery 30 when the brake booster pressure BBP does not decrease to the reference pressure Px, for example, depending on when the brake pedal 52 is trodden down.

In this way, as the rotational speed decrease start flag Xdown is set to ON (S400), the ER-ECU 40 determines NO at step S330 in the next control loop. Then, the ER-ECU 40 next determines whether or not a request has been made for driving a power steering pump (S410). A request may be made for driving the power steering pump, for example, when the vehicle is being steered, and when the steering is held at a position at which the power steering pump is heavily loaded, in which case the power steering hydraulic pressure is relatively high.

Here, if no request is made for driving the power steering pump (NO at S410), the target rotational speed NEt is reduced by an abated value (gradual change value) dNE as shown in the following equation (1) (S420):

$$NEt \leftarrow NEt - dNE \qquad (1)$$

Then, the ER-ECU 40 determines whether or not the corrected target rotational speed NEt is equal to or lower than a limit rotational speed NEs (S430). The limit rotational speed NEs is a rotational speed slightly higher than a resonant frequency inherent to the engine 2 (resonant speed). In one embodiment, the limit rotational speed NEs may be 400 rpm.

If NEt>NEs (NO at S430), the ER-ECU 40 controls the output of the M/G 26 such that the engine rotational speed NE reaches the target rotational speed NEt (S440). Then, this process is once terminated.

Subsequently, as step S420 is repeated, the target rotational speed NEt is set to the limit rotational speed NEs (S445) when NEt$\leq$NEs (YES at S430). Then, the ER-ECU 40 determines whether or not the engine rotational speed NE has reached the target rotational speed NEt (S450). If the engine rotational speed NE has not reached the target rotational speed NEt (NO at S450), this process is once terminated after the operation at step S440.

When the engine rotational speed NE has reached the target rotational speed NEt (YES at S450), the vibration reducing operation end flag Xstop is set to ON (S460), and then this process is once terminated. The vibration reducing operation end flag Xstop set to ON indicates that the vibration reducing operation is completed while the engine 2 is stopped.

If a request is made for driving the power steering pump (YES at S410) while the operations at steps S420, S440 are being repeated with NEt>NEs (NO at S430), the operation at step S440 is only executed, and the crankshaft rotating process is once terminated. In this event, since step S420 is not executed, the target rotational speed NEt is maintained at the target rotational speed NEt at that time, as long as the ER-ECU 40 determines YES at step S410. Then, subsequently, as no request is made for driving the power steering pump (NO at S410), the crankshaft rotating process is resumed for gradually reducing the target rotational speed NEt to the limit rotational speed NEs (at S420, S430).

After the target rotational speed NEt is gradually reduced to the limit rotational speed NEs in this way, Xstop is set to ON at S460. This causes the ER-ECU 40 to determine NO at step S210 (FIG. 3) in the next control loop. At S225, the ER-ECU 40 notifies the engine ECU 48 that it is allowed to turn the air conditioning on. At S230, the ER-ECU 40 determines whether or not a request is made for driving the auxiliary machine 22. If there is a request for driving the auxiliary machine (YES at S230), the electromagnetic clutch 10$a$ is turned off (S240), and the M/G 26 is set into the driving mode (S250). The operation at step S240 also includes maintaining the electromagnetic clutch 10$a$ in off state if it has already been turned off. This is applied to other operations which involve turning the electromagnetic clutch 10$a$ off.

Then, as a target rotational speed NMGt for the M/G 26, the ER-ECU 40 sets a rotational speed NMGidl which is calculated by converting the idle target rotational speed NEidl to the rotational speed of the M/G 26 (S260). Then, the output of the M/G26 is controlled by the inverter 28 such that the actual rotational speed of the M/G 26 reaches the target rotational speed NMGt (S270). Thus, the M/G driving process is once terminated.

On the other hand, if no request is made for driving the auxiliary machine (NO at S230), the M/G 26 is stopped (S280), and then this process is once terminated.

In this way, after the engine rotational speed NE is gradually reduced to the limit rotational speed NEs, the electromagnetic clutch 10$a$ is turned off (S240), or the M/G 26 is stopped (S280). Thus, the engine rotational speed is rapidly reduced below the resonant speed. The rotation of the crankshaft 2$a$ driven by the M/G 26 is stopped in the foregoing manner.

If there is a request for driving the auxiliary machine 22 (YES at S230) after the rotation of the engine 2 has been stopped by stopping the M/G 26 (S280), the M/G 26 can rotate the auxiliary machine 22. In this event, the auxiliary machine 22 is rotated at a speed equivalent to that when the engine 2 is idling. Therefore, even when the operation of the engine 2 is stopped, the air conditioning and power steering are driven in response to a request. For driving the M/G 26 while the operation of the engine 2 is stopped (S240g–S270), the electromagnetic clutch 10a is turned off, so that the crankshaft 2a of the engine 2 will not be rotated even if the M/G 26 drives it. Thus, useless power consumption is prevented to improve the fuel efficiency.

Figure 5:
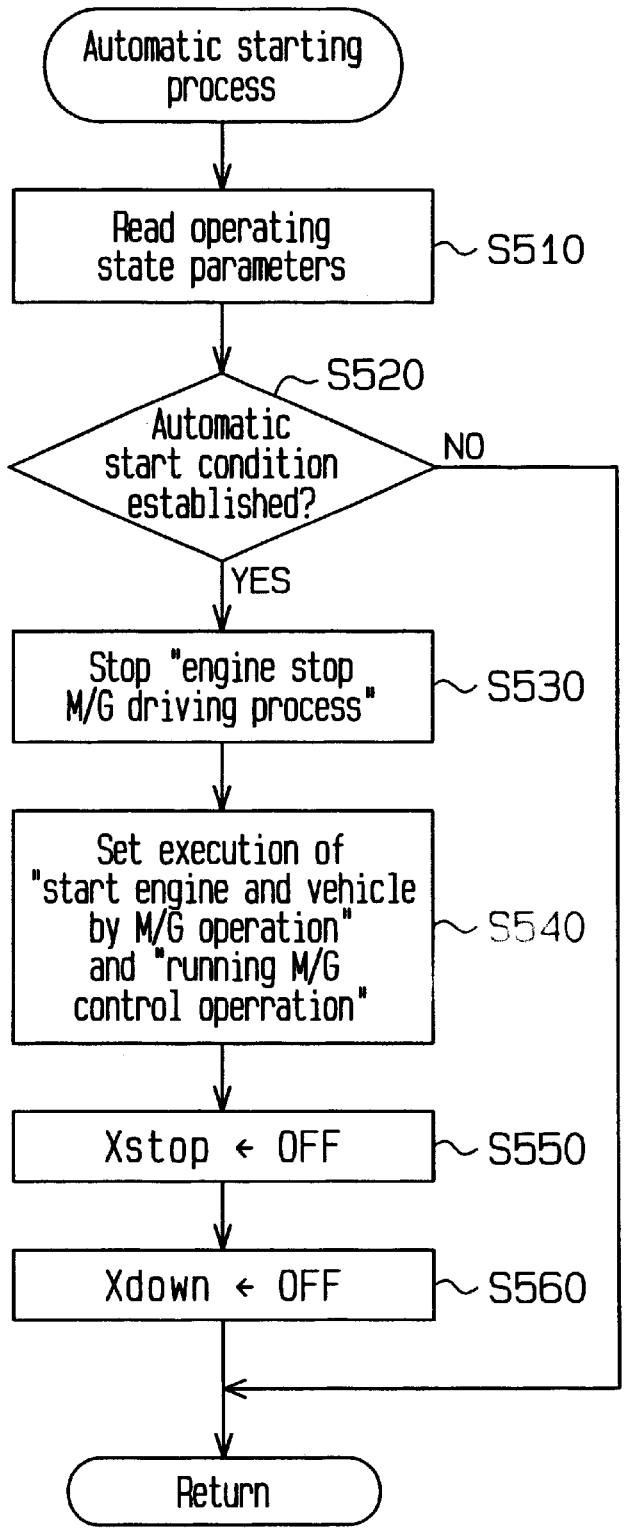
FIG. 5 is a flow chart illustrating an automatic engine combustion starting process.

Next, the automatic combustion starting process will be described with reference to FIG. 5. The automatic combustion starting process is repeatedly executed at a relatively short cycle.

First, at S510, the ER-ECU 40 first reads into its RAM operating state parameters such as the engine cooling water temperature THW, state of the idle switch, amount of charges accumulated in the batteries 30, 34, state of the brake switch 52a, and vehicle speed SPD.

At S520, the ER-ECU 40 determines from the operating state parameters whether or not an automatic start condition is established. The premise condition for automatic start condition is that the engine is stopped by the automatic stopping process. The automatic start condition comprises the following conditions (1)–(5).

(1) The engine 2 has been warmed up and is not overheated. Specifically, the engine cooling water temperature THW is lower than an upper limit water temperature and higher than a lower limit water temperature.

(2) The accelerator pedal is not being trodden down. Specifically, the idle switch is on.

(3) The amount of charge in the batteries 30, 34 have reached respective required levels.

(4) The brake pedal 52 is being trodden down. Specifically, the brake pedal 52a is on.

(5) The vehicle is stopped. Specifically, the vehicle speed SPD is 0 km/h.

If the engine is not stopped by the automatic stopping process, or if all of the conditions (1)–(5) are satisfied, the ER-ECU 40 determines that the automatic start condition is not established (NO at S520). In this event, the automatic starting process is once terminated.

On the other hand, the automatic start condition is determined to be established (YES at S520) if the engine has been stopped by the automatic stopping process, and if at least one of the conditions (1)–(5) is not satisfied. In this event, the ER-ECU 40 stops the combustion stop mode M/G driving process (FIG. 3) (S530). In addition, the ER-ECU 40 sets the execution of start vehicle and engine by M/G operation and a running mode M/G control operation (S540). Here, the start vehicle and engine by M/G operation is an operation for driving the M/G 26 to start the vehicle and the engine 2. The running mode M/G control operation is an operation for rotating the M/G 26 for generating electric power with the driving force of the engine 2 during a normal running and for recovering running energy of the vehicle using the M/G 26 during a fuel cut in vehicle deceleration.

At S550, the vibration reducing operation end flag Xstop is set to OFF. At S560, the rotation speed decrease start flag Xdown is set to OFF. Then, the automatic starting process is once terminated.

Figure 6:
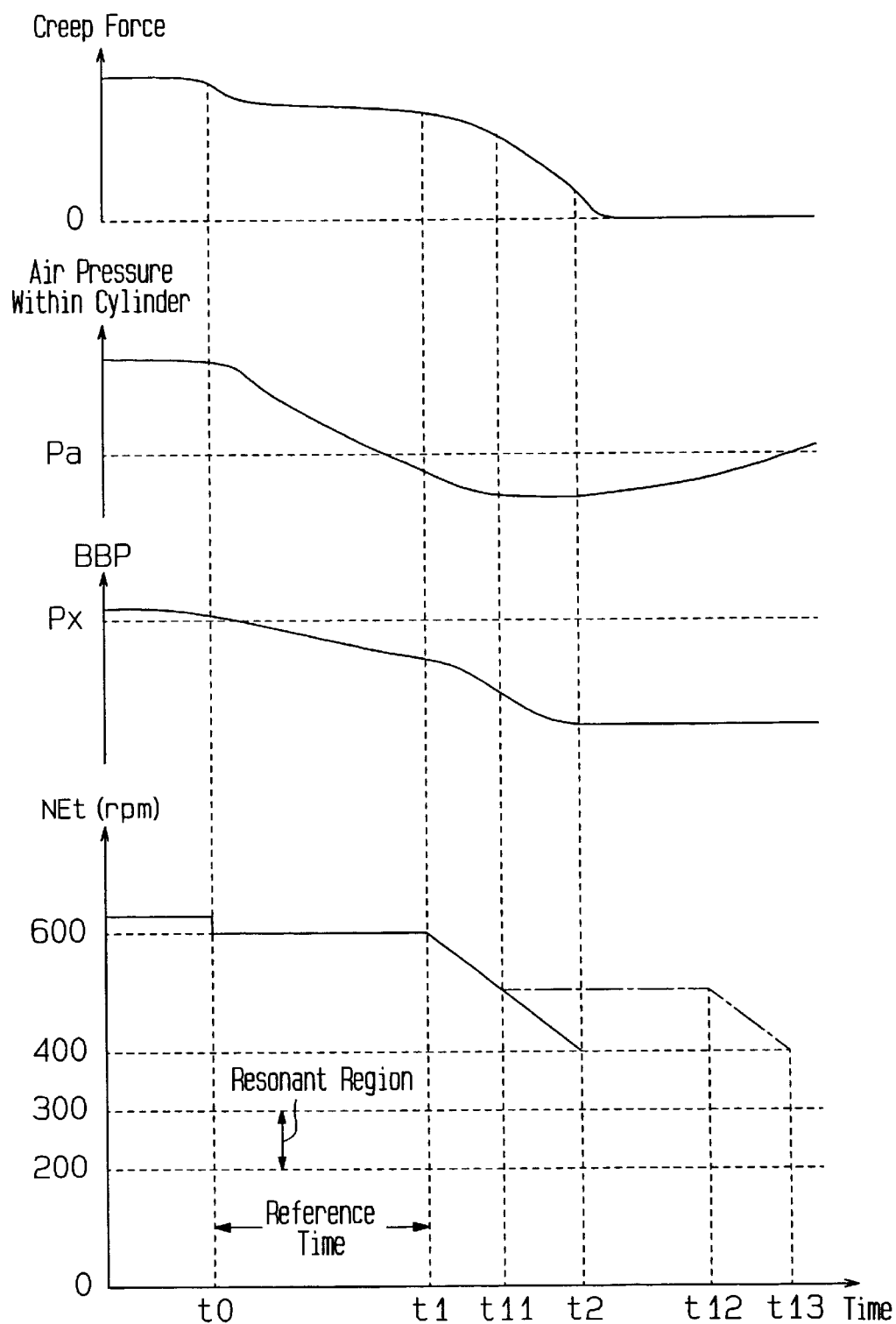
FIG. 6 is a timing chart showing a change in creep force, a change in air pressure within a cylinder, a change in brake booster pressure, and a change in target engine rotational speed resulting from the control performed in accordance with the first embodiment.

The control according to one embodiment will be described with reference to a timing chart of FIG. 6.

Before time t0, the engine 2 is operated at an idling rotational speed in accordance with a loading state at that time by an idling rotation control executed by the engine ECU 48 after the vehicle has been stopped.

At time t0, the automatic stop condition is established, and fuel injection from the fuel injection valve 42 is stopped. This results in stoppage of combustion of the engine 2. With the combustion stop mode M/G driving process (FIGS. 3, 4), the M/G 26 is driven to set the target engine rotational speed NEt to the target idle rotational speed NEidl (for example, 600 rpm). This rotating state continues for the reference time. During the forced rotation of the engine 2 by the M/G 26, the throttle valve 46 is fully closed. For this reason, an air pressure within a cylinder is reduced to an air pressure Pa or lower at which vibrations are prevented with suffice while the operation of the engine 2 is stopped.

At time t1 after the lapse of the reference time, the brake booster pressure BBP has already been reduced to the reference pressure Px or less. For this reason, after time t1, the target engine rotational speed NEt gradually becomes lower. Therefore, a gradually reduced creep force is transmitted to the wheels through the torque converter 4 and the A/T 6 remaining in a non-lock-up state.

Then, at time t2, the target engine rotational speed NEt reaches the limit rotational speed NEs (for example 400 rpm). In this event, the M/G 26 is stopped if there is no request for driving the auxiliary machine 22. On the other hand, the electromagnetic clutch 10a is turned off if there is a request for driving the auxiliary machine 22. In this way, the engine 2 is stopped.

If the steering is manipulated at time t11 in a period (t1–t2) in which the target engine rotational speed NEt gradually becomes lower, a request is made for driving the power steering pump. For this reason, the target rotational speed NEt is maintained until the request for driving the power steering pump is removed (at time t12), as indicated by a chain line. In this way, the M/G 26 can operate the power steering pump. When the request for driving the power steering pump is removed (at time t12), the target engine rotational speed NEt is gradually reduced, and the target engine rotational speed NEt reaches the limit rotational speed NEs at time t13. The M/G 26 is stopped at time t13 if there is no request for driving the auxiliary machine 22. On the other hand, if there is a request for driving the auxiliary machine 22, the electromagnetic clutch 10a is turned off. In this way, the engine 2 is stopped.

In the first embodiment, the M/G 26 acts as internal combustion engine rotating means. The ER-ECU 40 which executes steps S310–S370, S400, S420–S460 acts as vibration reducing means.

According to the first embodiment, the following advantages are provided.

(1a) In the automatic stop control for the engine 2, the engine rotational speed NE is maintained at the reference rotational speed (target idle rotational speed NEidl) for the reference time. This reduces the air pressure within the cylinder of the engine 2, and also reduces fluctuations in pressure in the combustion chamber due to the rotation of the engine. Also, the engine 2 is stopped after the reduction in the air pressure in the cylinder. As a result, fluctuations in torque and vibrations are reduced during a period in which the engine 2 is stopped. Therefore, the driver will not be given discomfort.

(1b) The engine rotational speed NE is gradually reduced from the target idle rotational speed NEidl. Since this causes the creep force to be slowly reduced, the vehicle is free from vibrations. Therefore, the driver will not be given discomfort.

(1c) The engine rotational speed NE is slowly reduced to a predetermined value which is immediately before the resonant speed (200–300 rpm), i.e., slightly higher than the resonant speed. The engine 2 is stopped at the time the engine rotational speed NE reaches the predetermined value.

If the rotational speed was gradually reduced likewise when the engine rotational speed NE is at the resonant speed, vibrations would occur due to the resonance. On the other hand, if the engine rotational speed NE was gradually reduced until the engine 2 is stopped, the air pressure within the cylinder would rise due to a leak of air from the throttle valve 46. This results in the inability to suppress fluctuations in torque.

In one embodiment, the engine rotational speed NE is gradually reduced, and the driving of the M/G 26 is instantly stopped immediately before reaching the resonant speed, thereby effectively preventing the vibrations. Moreover, since the creep force immediately before the resonant speed is relatively small, a large difference in creep force will not be produced even if the engine 2 is instantly stopped immediately before reaching the resonant speed. Therefore, the vehicle is prevented from vibrations, thereby avoiding giving discomfort to the driver.

Second Embodiment

Figure 7:
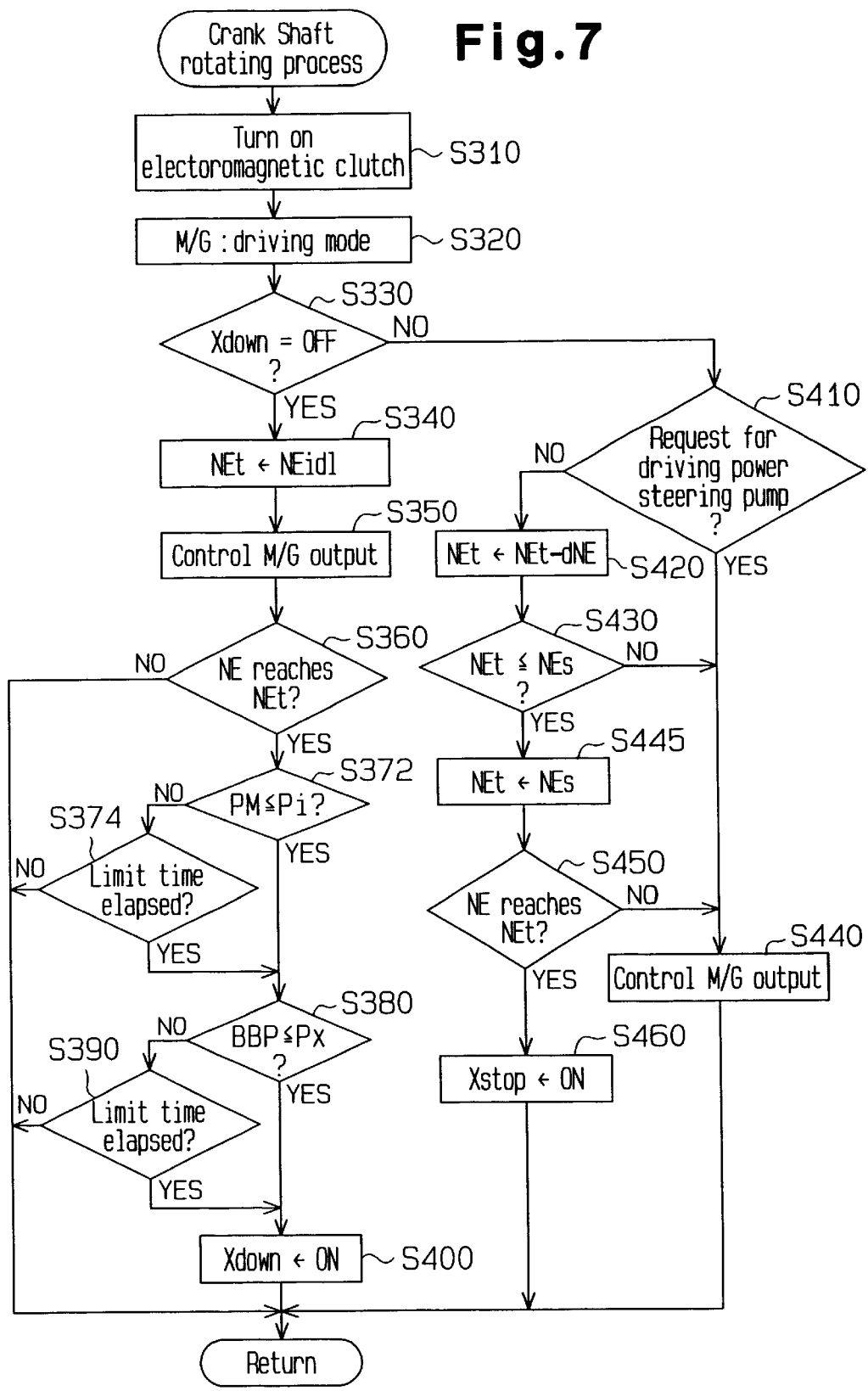
FIG. 7 is a flow chart illustrating a crankshaft rotating process according to a second embodiment of the present invention.

A second embodiment executes a crankshaft rotating process in FIG. 7 in place of the crankshaft rotating process (FIG. 4) of the first embodiment. Also, the surge tank 2c is provided with an intake pressure sensor for detecting an intake pipe pressure PM to output a signal indicative of the detected intake pipe pressure PM to the engine ECU 48. The rest of the second embodiment is identical to the first embodiment. Further, in the process of FIG. 7, steps S372, S374 are executed in place of step S370 in FIG. 3. In the following, description will be centered on steps S372, S374 in FIG. 7.

After starting the crankshaft rotating process, when the engine rotational speed NE of the engine 2, driven by the M/G 26, reaches the target rotational speed NEt, the ER-ECU 40 determines YES at S360. Then, the ER-ECU 40 determines at S372 whether or not the intake pipe pressure PM is equal to or lower than a reference intake pressure Pi. The reference intake pressure Pi is an air pressure within the engine cylinder which is sufficiently reduced for preventing vibrations when the engine 2 is stopped.

If PM>Pi (NO at S372), the ER-ECU 40 determines at S374 whether or not a limit time has elapsed after the engine rotational speed NE had reached the target rotational speed NEt. The limit time is set, for example, in a range of 0.5 to 3 seconds. The ER-ECU 40 determines NO at S374 until the limit time has elapsed, and subsequently, steps S340, S350 are repeated. If PM≦Pi, the ER-ECU 40 determines YES at S374, and the ER-ECU 40 again determines at S380 whether or not the brake booster pressure BBP is equal to or lower than the reference pressure Px. Subsequently, the same operation is performed as in the first embodiment.

In the second embodiment, the ER-ECU 40 which executes steps S310–S370, S400, S420–S460 acts as vibration reducing means.

According to the second embodiment, the following advantages are provided.

(2a) When the engine 2 is automatically stopped, the engine rotational speed NE is maintained at the reference rotational speed until the intake pipe pressure PM is reduced to the reference intake pressure Pi or lower. This reduces the air pressure within the cylinder of the engine 2, thereby reducing fluctuations in the pressure within the combustion chamber. The rotation of the engine 2 is subsequently stopped, thereby suppressing vibrations when the engine 2 is stopped.

(2b) The air pressure within the cylinder is determined based on the intake pipe pressure PM. Therefore, a reduction in the air pressure within the cylinder is more securely determined at an earlier time. Since the rotation of the crankshaft 2a is rapidly stopped while vibrations are suppressed, the driving of the engine by the M/G 26 is stopped at an earlier stage, thereby further improving the fuel efficiency and avoiding discomfort given to the driver.

(2c) The advantages set forth in (1b), (1c) of the first embodiment are provided as well.

Third Embodiment

Figure 8:
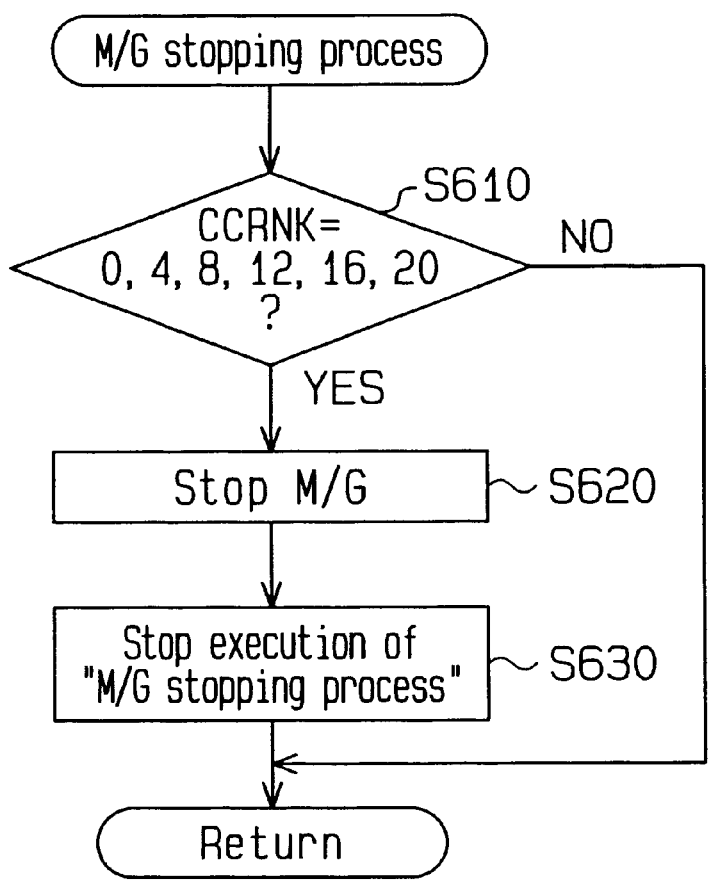
FIG. 8 is a flow chart illustrating an M/G stopping process according to a third embodiment of the present invention.

A third embodiment performs an M/G stopping process illustrated in FIG. 8 after executing the M/G stopping process (S280) in the combustion stop mode M/G driving process in FIG. 3 according to the first embodiment. The rest of the third embodiment is identical to the first embodiment.

The M/G stopping process illustrated in FIG. 8 is an interrupt process which is repeatedly executed at a short cycle by step S280.

Figure 9:
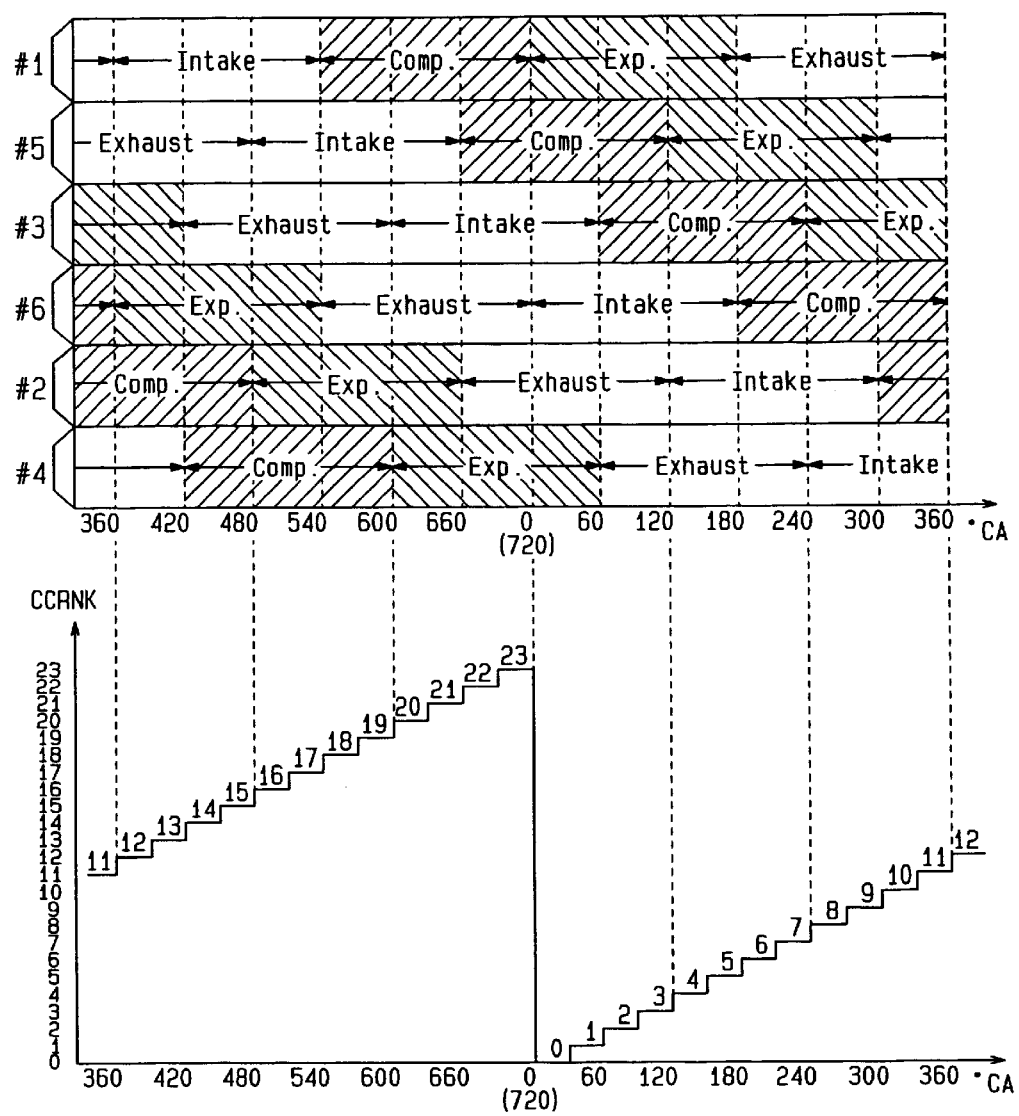
FIG. 9 shows a control conducted by the third embodiment, where the horizontal axis represents a crankshaft angle CA; the lower vertical axis a crank counter CCRNK; and the upper vertical axis strokes of each cylinder.

At step S610, the ER-ECU 40 determines whether a current crank counter CCRNK is 0, 4, 8, 12, 16 or 20. The crank counter CCRNK is counted up every 30° of the crank angle by an operation separately performed by the engine ECU 48. Based on the crank counter CCRNK, the ER-ECU 40 determines the crank angle and a stroke of each cylinder. As shown in FIG. 9, the crank counter CCRNK takes values from 0 to 23. A first cylinder #1 is positioned at a compression top dead center at the timing the crank counter CCRNK is zero; a fifth cylinder #5 is positioned at the compression top dead center at the timing CCRNK reaches four; a third cylinder #3 is positioned at the compression top dead center at the timing CCRNK reaches eight; a sixth cylinder #6 is positioned at the compression top dead center at the timing CCRNK reaches 12; a second cylinder #2 is positioned at the compression top dead center at the timing CCRNK reaches 16; and a fourth cylinder #4 is positioned at the compression top dead center at the timing CCRKN reaches 20. Therefore, the ER-ECU 40 determines at step S610 which of the cylinders is positioned at the compression top dead center.

If the crank counter CCRNK does not indicate any of 0, 4, 8, 12, 16, 20 (NO at S610), the M/G stopping process is once terminated. Therefore, the M/G 26 is not stopped.

When the crank counter CCRNK indicates any of 0, 4, 8, 12, 16, 20 after the M/G stopping process (FIG. 8) has been repeated, the ER-ECU 40 determines YES at S610. Then, at S620, the power to the M/G 26 is shut off to stop the M/G 26. This causes the crankshaft 2a of the engine 2 to stop. At S630, the ER-ECU 40 stops the execution of the M/G stopping process in FIG. 8.

The M/G stopping process (FIG. 8) is not executed until the automatic stop condition is again established for the engine 2 to cause the ER-ECU 40 to execute the combustion stop mode M/G driving process (FIG. 3).

Figure 10:
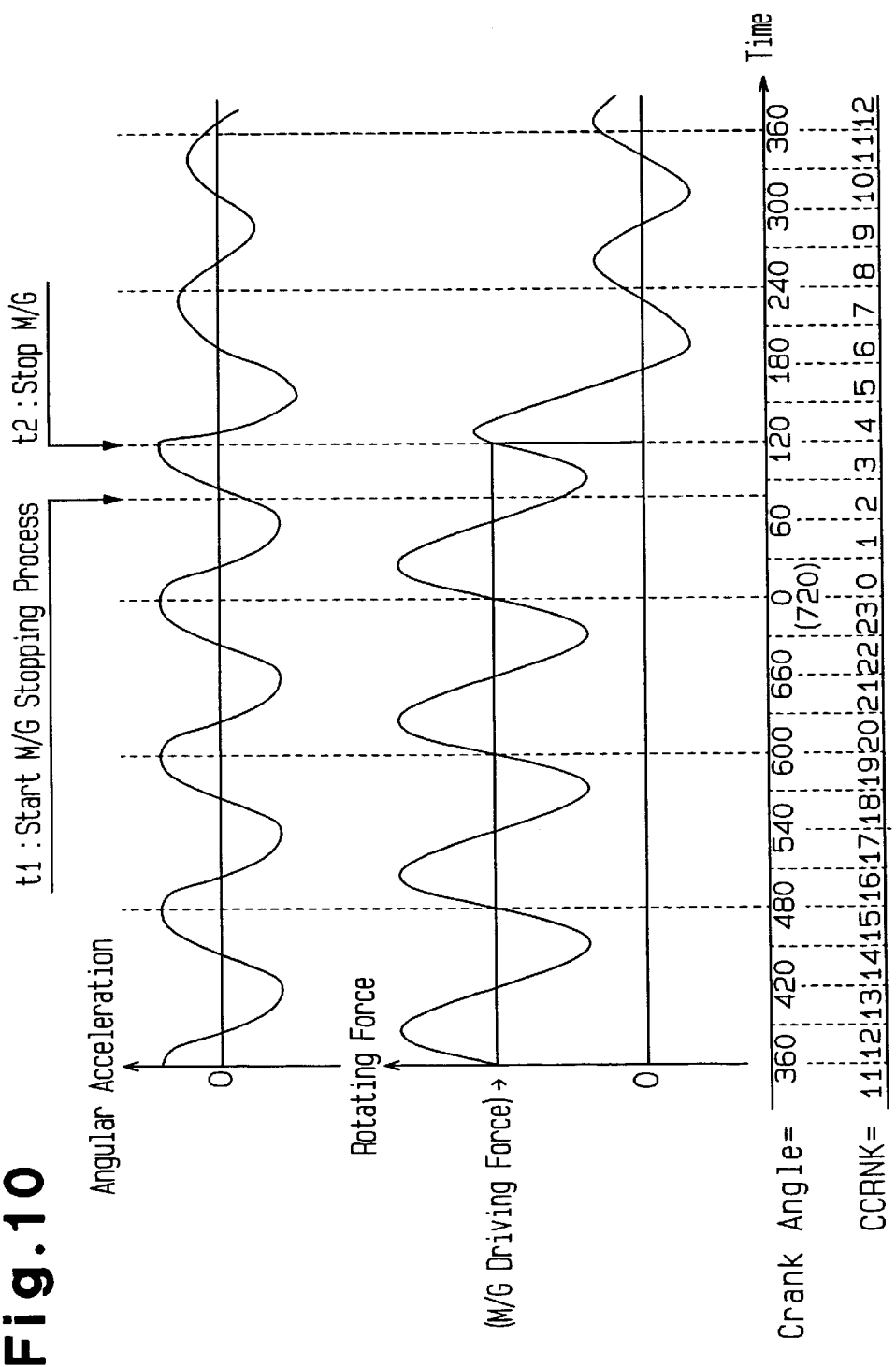
FIG. 10 is a timing chart showing the control in the third embodiment.

A driving force provided from the M/G 26 to the crankshaft 2a will be described with reference to a timing chart of FIG. 10.

The combustion of the engine 2 has already been stopped before time t1, so that the engine 2 is forced to rotate by the M/G 26. The driving force of the M/G 26 fluctuates in an undulating form in response to the pressures in the combustion chambers of the six cylinders of the engine 2, so that the crankshaft 2a of the engine 2 also presents an undulating angular acceleration.

A rotating force acting on the crankshaft 2a of the engine 2 is a combination of a rotating force generated by the pressures in the combustion chambers of the engine 2 and the driving force of the M/G 26. Therefore, the angular acceleration of rotation of the crankshaft 2a generated by the combined rotating force fluctuates between a positive region and a negative region by the action of the pressures in the combustion chambers of the engine 2.

Therefore, at the moment the engine 2 driven by the M/G 26 is shut off, a negative angular acceleration of rotation, in the direction opposite to the driving direction, is added to the angular acceleration of rotation of the crankshaft 2a. For this reason, if the driving of the M/G 26 is turned off at a timing at which a negative angular acceleration of rotation is produced by the pressure in the combustion chamber of the engine 2, the negative angular acceleration of rotation is added so that the absolute value of the angular acceleration of rotation is increased. This will cause a large shock. On the other hand, if the driving of the M/G 26 is turned off at a timing at which a positive angular acceleration of rotation is produced by the pressure in the combustion chamber of the engine 2, positive and negative angular accelerations of rotation cancel each other so that the absolute value of the angular acceleration of rotation is reduced. This suppresses the vibrations when the rotation of the crankshaft 2a is stopped.

Step S280 in FIG. 3 is executed at time t1 to execute the M/G stopping process (FIG. 8) as an interrupt. In this event, since the crank counter CCRNK indicates "2", the ER-ECU 40 determines NO at S610, so that the M/G stopping process in FIG. 8 is continuously repeated without stopping the M/G 26.

The crank counter CCRNK reaches "4" at time t2. In this event, the ER-ECU 40 determines YES at S610, and stops the M/G 26 at S620. At time t2, the rotating force produced by a combination of pressures in the combustion chambers of the six cylinders becomes substantially maximum, so that the angular acceleration of the crankshaft 2a presents substantially a maximum positive value.

At time t2, the crankshaft 2a driven by the M/G 26 is shut off, resulting in negative angular acceleration added to the crankshaft 2a. Therefore, as shown in FIG. 10, the maximum positive angular acceleration and the negative angular acceleration cancel each other so that a change in the angular acceleration is relatively small after the M/G 26 is stopped.

Figure 11:
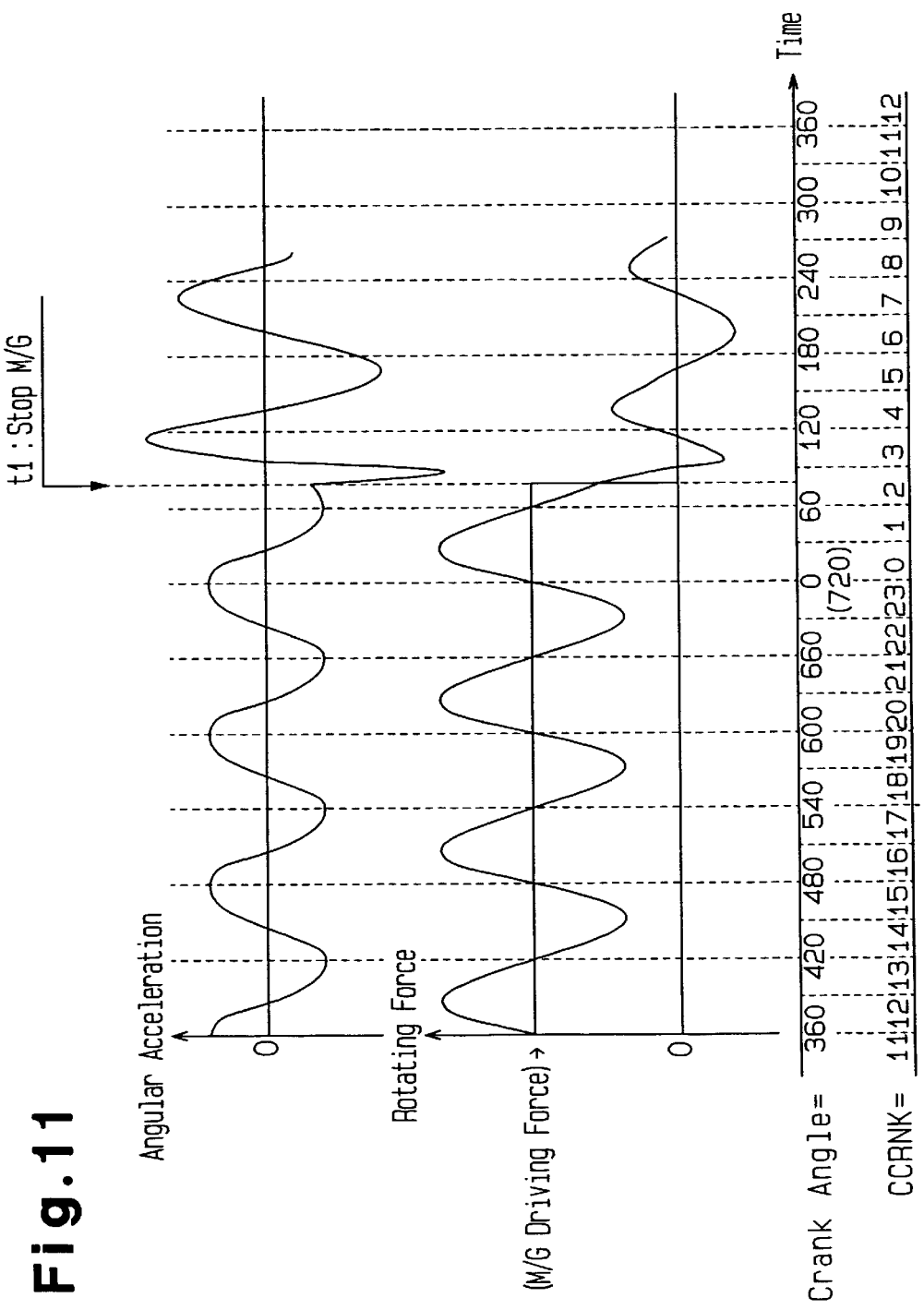
FIG. 11 is a timing chart showing a control conducted by a comparative example.

FIG. 11 shows a timing chart for a comparative example. In the comparative example, the M/G 26 is stopped at time t1. The time t1 is included in a period in which the rotating force is decreasing, and the crankshaft 2a presents a negative angular acceleration. Therefore, a negative angular acceleration produced by a combination of pressures in the combustion chambers of the six cylinders is added to the negative angular acceleration produced by turning off the driving force of the M/G 26, so that the angular acceleration largely fluctuates as shown in FIG. 11.

In the third embodiment, the ER-ECU 40 which executes steps S310–S370, S400, S420–S460, and the M/G stopping process (FIG. 8) acts as vibration reducing means.

According to the third embodiment, the following advantages are provided.

(3a) The advantages set forth in (1a), (1b) and (1c) of the first embodiment are provided as well.

(3b) The timing at which the M/G 26 is stopped is set at the time the crankshaft 2a presents a positive angular acceleration, particularly, when the crankshaft 2a presents substantially the maximum angular acceleration (when the cylinder is at the top dead center).

Thus, the positive angular acceleration and the negative angular acceleration produced by turning off the driving force of the M/G 26 cancel each other, thereby suppressing the absolute value of the angular acceleration to a small value after the M/G 26 is stopped. In this way, it is possible to more effectively suppress the vibrations produced when the rotation of the engine 2 is stopped.

Here, vibrations depending on the timing at which the M/G 26 is stopped will be described with reference to FIGS. 12 and 13.

Figure 12:
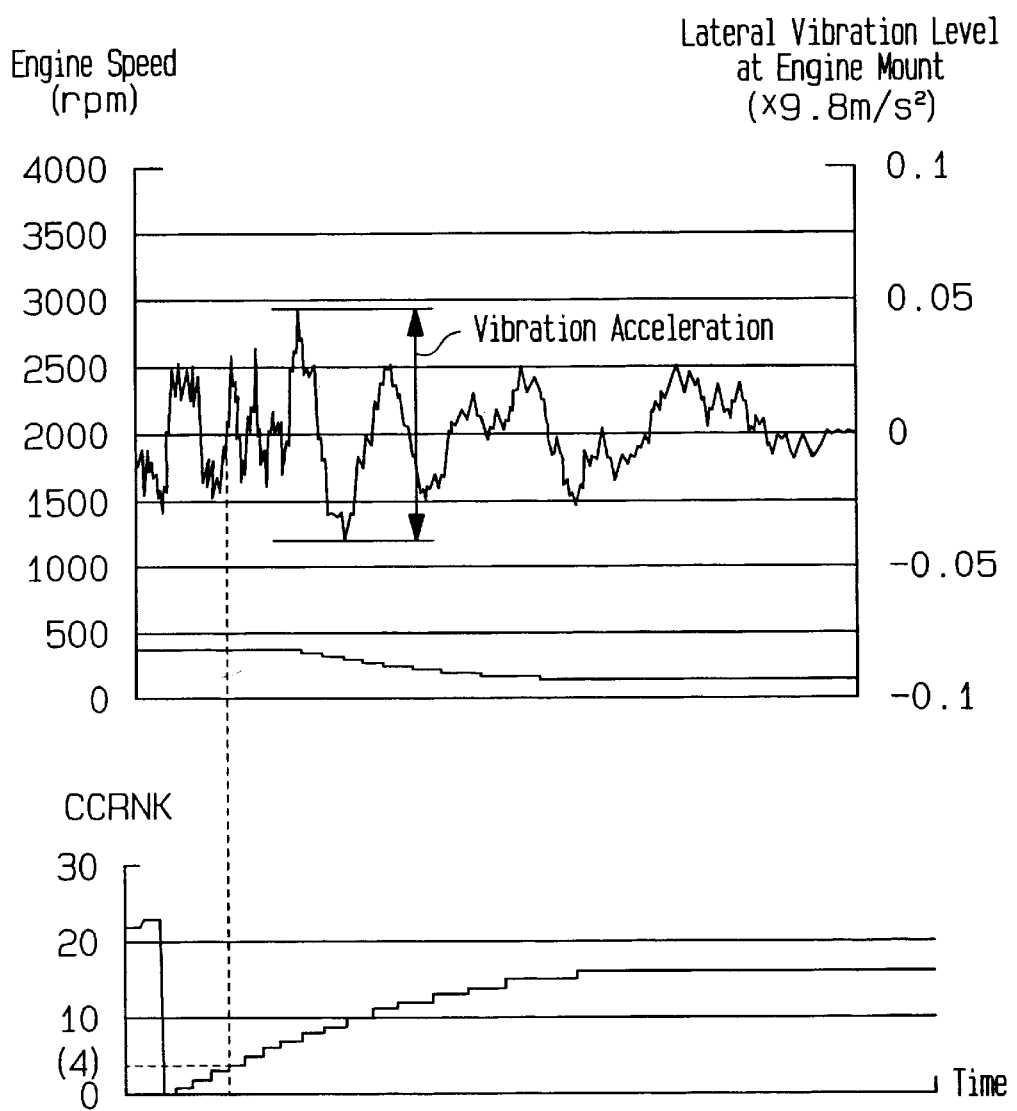
FIG. 12 is a graph showing actually measured data in the third embodiment, where the horizontal axis represents time; the lower vertical axis a crank counter CCRNK; the upper left vertical axis an engine rotational speed; and the upper right vertical axis a vibration level.
Figure 13:
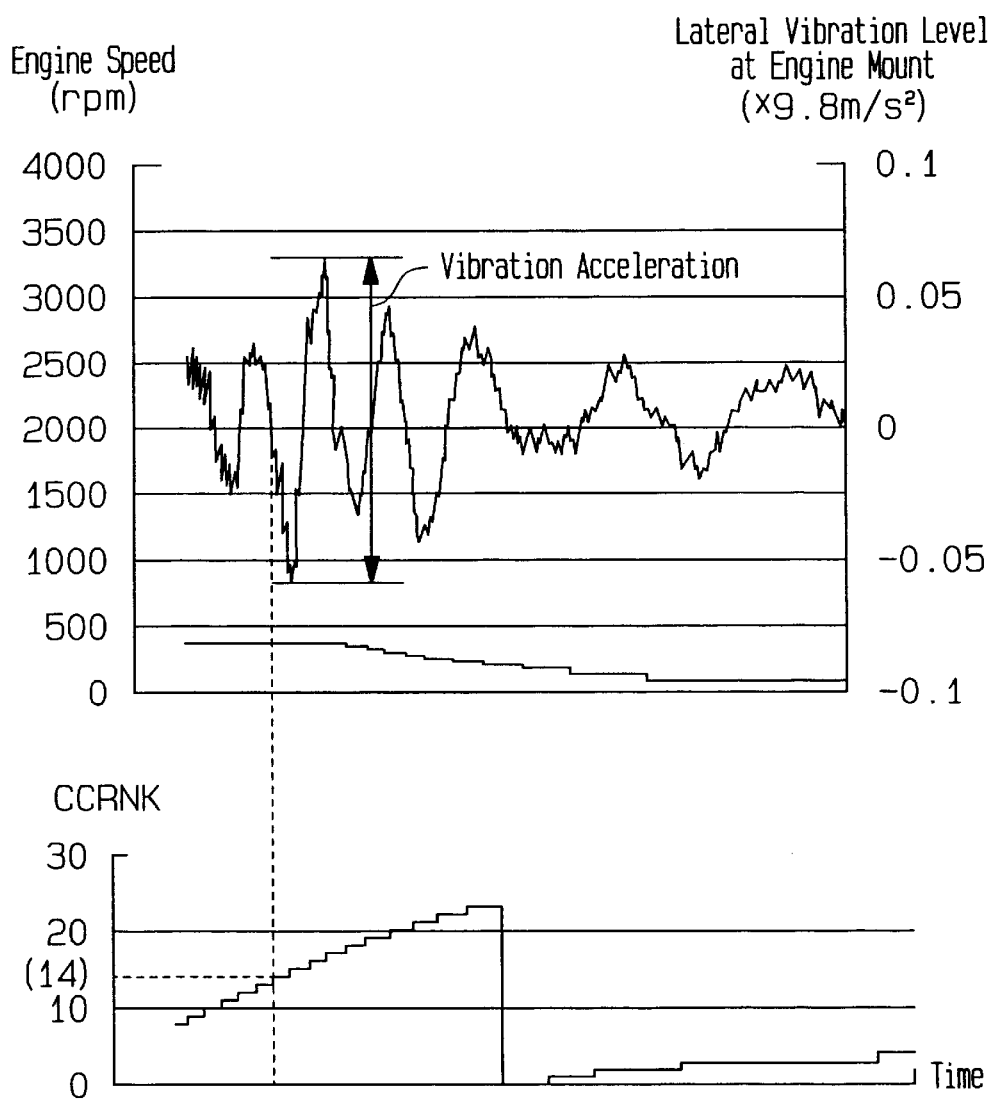
FIG. 13 is a graph showing actually measured data in a comparative example, where the horizontal axis represents time; the lower vertical axis a crank counter CCRNK, the upper left vertical axis an engine rotational speed; and the upper right vertical axis a vibration level.

FIG. 12 shows vibrations produced when the M/G 26 is stopped at the time the fifth cylinder #5 is positioned at the compression top dead center, i.e., when the crank counter CCRNK indicates "4." FIG. 13 shows vibrations in a comparative example, in which the M/G 26 is stopped at the timing a negative angular acceleration is being produced, specifically, when the crank counter CCRNK indicates "14."

As can be seen from a comparison of FIG. 12 with FIG. 13, the vibration level in FIG. 12 is lower than the vibration level in FIG. 13.

Figure 14A:
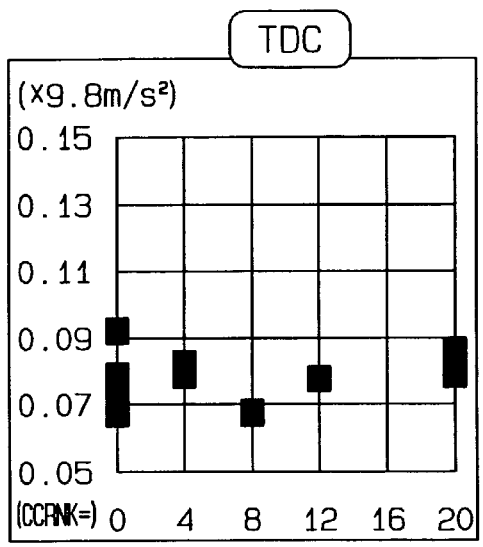
FIGS. 14A and 14B are graphs showing distributions of the actually measured data in the third embodiment shown in FIG. 12.
Figure 14B:
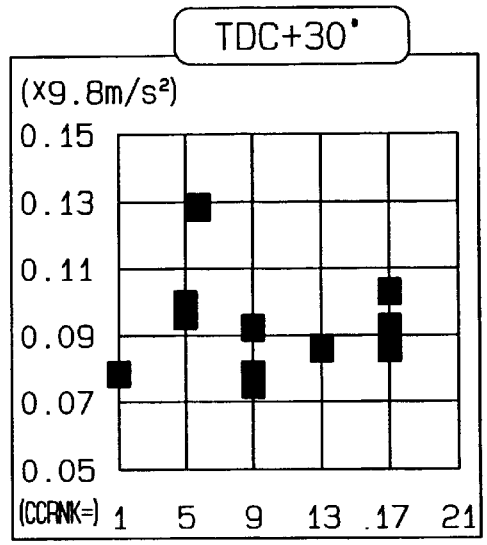
Figure 14C:
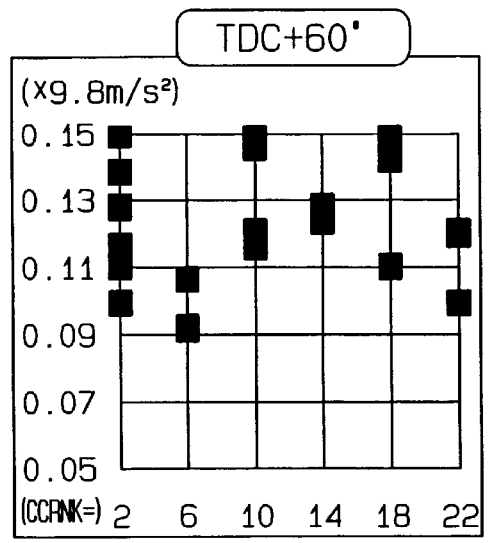
FIGS. 14C and 14D are graphs showing distributions of the actually measured data in the comparative example shown in FIG. 13.
Figure 14D:
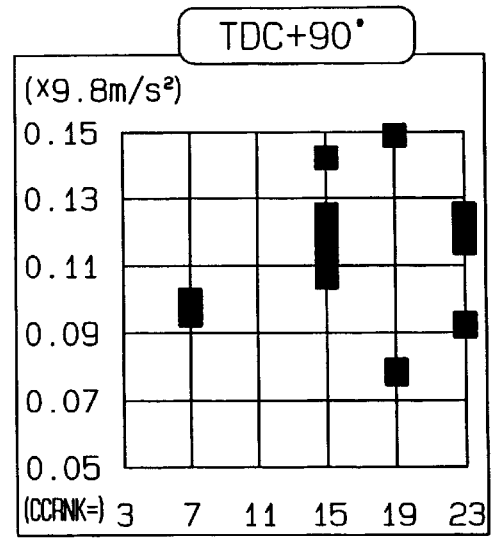

FIGS. 14(A)–14(D) show the relationship between the timing at which the M/G 26 is stopped and vibrations of an engine mount. Specifically, in FIG. 14(A), the M/G 26 is stopped when each cylinder is positioned at the compression top dead center (CCRNK=0, 4, 8, 12, 16, 20). In FIG. 14(B), the M/G 26 is stopped when each cylinder is positioned at the compression top dead center plus 30° (CCRNK=1, 5, 9, 13, 17, 21). In FIG. 14(C), the M/G 26 is stopped when each cylinder is positioned at the compression top dead center plus 60° (CCRNK=2, 6, 10, 14, 18, 22). In FIG. 14(D), the M/G 26 is stopped when each cylinder is positioned at the compression top dead center plus 90° (CCRNK=3, 7, 11, 15, 19, 23).

As shown in FIG. 14(A), it can be seen that smaller vibrations are produced when the M/G 26 is stopped at the timing at which the increasing rate of the rotating force is substantially maximal, i.e., the absolute value of positive angular acceleration is substantially maximal. As shown in FIG. 14(C), it can be seen that very large vibrations are produced when the M/G 26 is stopped at the timing at which the reducing rate of the rotating force is substantially maximal, i.e., the absolute value of negative angular acceleration is substantially maximal.

Fourth Embodiment

A fourth embodiment employs a variable limit rotational speed NEs used at steps S430, S445 in the crankshaft rotating process in FIG. 4. The limit rotating speed NEs is calculated by the ER-ECU 40 in the process of FIG. 15. Also, a cylinder block of the engine 2 is provided with an acceleration sensor for detecting vibrations of the engine 2, specifically, rolling vibrations caused by the rotation of the crankshaft 2a. The rest of the fourth embodiment is identical to the first embodiment.

The limit rotational speed NEs is set in accordance with a flow chart of FIG. 15. This process is performed at step S400 in FIG. 4 in a period in which the crankshaft 2a is being driven by the M/G 26 to rotate after the rotational speed decrease start flag Xdown is set to ON.

At S710, the ER-ECU 40 determines whether or not the rotational speed decrease start flag Xdown is ON. If Xdown is OFF (NO at step S710), a limit rotational speed setting end flag Xnes is set to OFF at S720, and then this process is once terminated.

If Xdown has been set to ON at step S400 in the crankshaft rotating process (FIG. 4) (YES at S710), the ER-ECU 40 determines at S730 whether or not the limit rotational speed setting end flag Xnes is OFF. Since Xnes is set to OFF in initial settings, the ER-ECU 40 determines YES at S730. Then, the ER-ECU 40 determines at S740 whether or not the vibration reducing operation end flag Xstop is ON. Since Xstop is OFF in a state in which the engine 2 is driven by the M/G 26 to rotate at the engine rotational speed NE which is gradually being reduced (NO at step S430 or NO at step S450 in FIG. 4), the ER-ECU 40 determines NO at S740. In this event, the acceleration sensor continuously samples the acceleration at short time intervals (S750). Thus, the limit rotational speed setting process is once terminated.

A long as Xdown=ON (YES at S710), Xnes=OFF (YES at S730), and Xstop=OFF (NO at S740), the acceleration is continuously sampled in the rolling direction in the cylinder block of the engine 2 (S750).

Subsequently, upon completion of the reduction in the engine rotational speed NE of the engine 2 driven by the M/G 26, the vibration reducing operation end flag Xstop is set to ON (step S460 in FIG. 4). Therefore, as Xstop=ON stands (YES at S740), a fast Fourier Transform (FFT) operation is executed on the sampled acceleration data (S760). With the FFT operation, the frequency spectrum is calculated for the acceleration.

The ER-ECU 40 determines whether or not the resulting frequency spectrum includes a frequency at which a vibration magnitude represented by the absolute value of acceleration is equal to or larger than a reference magnitude (S770). Here, the reference magnitude is set at a magnitude at which the acceleration begins giving discomfort to passengers in the vehicle, or a value slightly lower than this magnitude.

If the vibration magnitude is less than the reference magnitude at all of frequencies within the frequency spectrum derived from the FFT operation (NO at S770), a currently set limit rotational speed NEs is reduced by a decremental correction value NEd as expressed by the following equation (2) (S780):

$$NEs \leftarrow NEs - NEd \quad (2)$$

At S790, the limit rotation speed setting end flag Xnes is set to ON, and then this process is once terminated. In the subsequent setting of the limit rotational speed NEs, no operation is substantially performed since the ER-ECU 40 determines NO at S730.

On the other hand, if the frequency spectrum resulting from the FFT operation includes a frequency at which the vibration magnitude is larger than the reference magnitude, the ER-ECU 40 determines YES at S770. In this event, the ER-ECU 40 calculates the highest one of frequencies at which the reference magnitude is exceeded at S800, and sets the highest frequency as a maximum frequency fmax.

The engine rotational speed corresponding to the maximum frequency fmax is calculated based on a function Fne (or a map). This corresponding engine rotational speed is corrected as expressed by the following equation (3) to newly calculate the limit rotational speed NEs (S810):

$$NEs \leftarrow Fne(fmax) + NEp \quad (3)$$

By adding an incremental correction value NEp, the limit rotational speed NEs is set for stopping the rotation of the crankshaft 2a before the resonance of the engine 2 arises.

At S790, the limit rotational speed setting end flag Xnes is set to ON, and then this process is once terminated. In the subsequent limit rotational speed NEs setting process, no operation is substantially performed since the ER-ECU 40 determines NO at S730.

In the fourth embodiment, the limit rotational speed NEs setting process (FIG. 15) corresponds to a resonant speed detecting step.

According to the fourth embodiment, the following advantages are provided.

(4a) The advantages set forth in (1a), (1b), (1c) of the first embodiment are provided as well.

(4b) When the resonance arises during a period in which the engine rotational speed NE is reduced by the driving of the M/G 26, frequencies which cause the resonance are detected. The limit rotational speed NEs is set based on the maximum frequency fmax of detected frequencies. Therefore, the limit rotational speed NEs is optimized by the limit rotational speed NEs setting process (FIG. 15) even if the initially set limit rotational speed NEs is not appropriate for preventing the resonance or has been changed to an inappropriate one due to variations in engine mount, change in temperature, or aging changes. Consequently, the vibrations are securely prevented.

(4c) If no resonance arises during a period in which the engine rotational speed NE is gradually reduced by the driving of the M/G 26, the limit rotational speed NEs is reduced. Thus, the creep force is minimized since the limit rotational speed NEs is reduced as much as possible within a range in which no resonance arises. As a result, a difference in the creep force is hardly produced even if the engine is instantly stopped from the limit rotational speed NEs, thereby preventing the vehicle from vibrating. Thus, the driver is prevented from suffering from discomfort.

Fifth Embodiment

Figure 16:
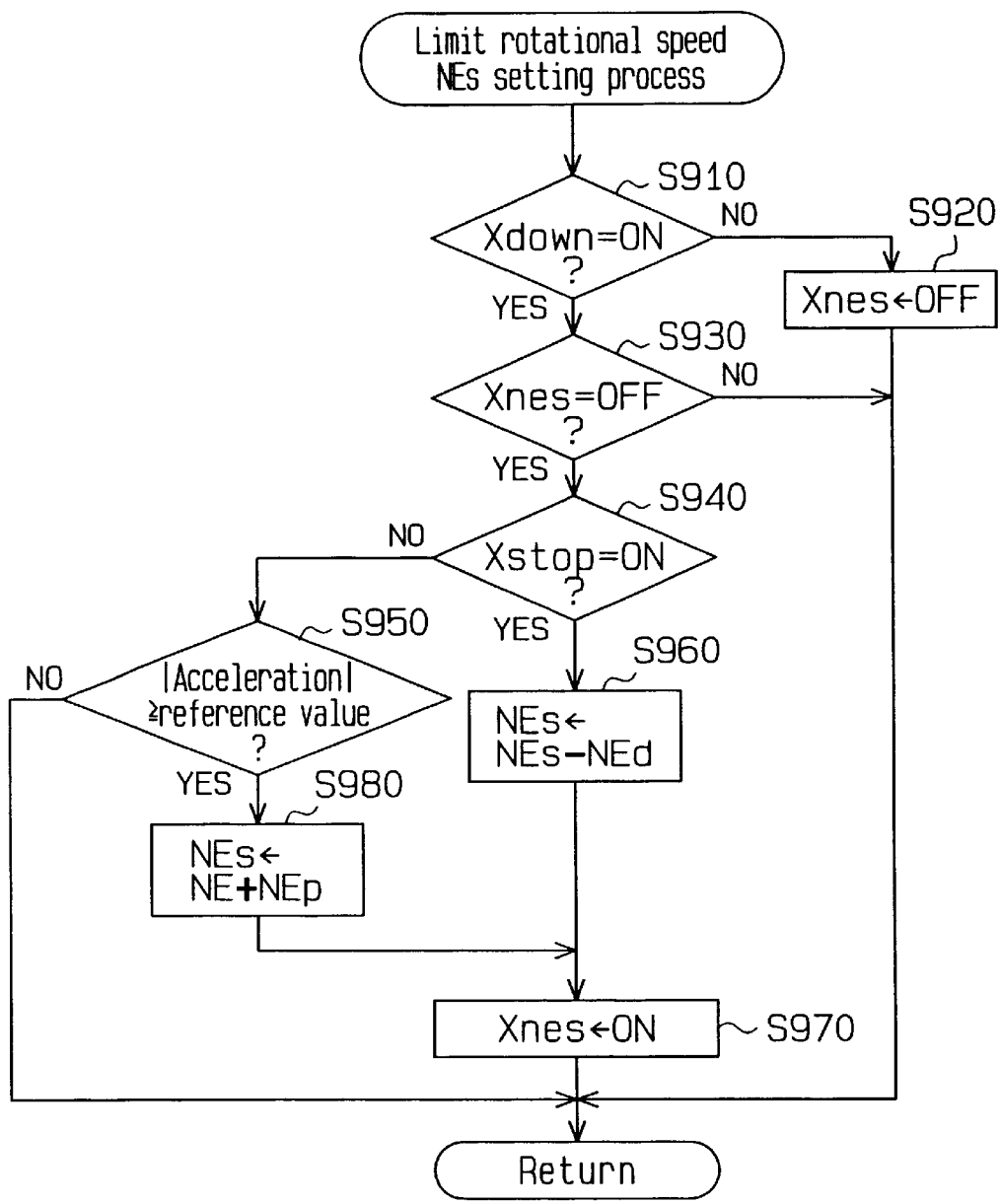
FIG. 16 is a flow chart illustrating a limit rotational speed (NEs) setting process according to a fifth embodiment.

A fifth embodiment executes a process of FIG. 16 in place of the process of FIG. 15. The rest of the fifth embodiment is identical to the fourth embodiment.

Another limit rotational speed NEs setting process will be described with reference to FIG. 16. At S910, the ER-ECU 40 determines whether or not the rotational speed decrease start flag Xdown is ON. If Xdown is OFF (NO at S910), the limit rotational speed setting end flag Xnes is set to OFF (S920), and then this process is once terminated.

On the other hand, when Xdown has been set to ON at step S400 in FIG. 4, the ER-ECU 40 determines YES at S910, and again determines at S930 whether or not the limit rotational speed setting end flag Xnes is OFF. Since Xnes is OFF in initial settings, the ER-ECU 40 determines YES at S930. Next, the ER-ECU 40 determines at S940 whether or not the vibration reducing operation end flag Xstop is ON. Since Xstop is OFF when the ER-ECU 40 has determined NO at step S430 or NO at step S450 in FIG. 4, i.e., when engine 2 is driven by the M/G 26 to rotate at the engine rotational speed NE which is gradually being reduced, the ER-ECU 40 determines NO at S940. Then, the ER-ECU 40 determines at S950 whether or not the absolute value of acceleration is equal to or larger than a reference value. The reference value is set to a level at which the acceleration begins giving discomfort to passengers in the vehicle, or a level slightly lower than that.

If the absolute value of acceleration is less than the reference value (NO at S950), the limit engine rotational speed setting process is once terminated.

When the reduction in the engine rotational speed NE by the driving of the M/G 26 is terminated with the absolute value of acceleration remaining below the reference value, the vibration reducing operation end flag Xstop is set to ON (S460 in FIG. 4). This results in YES at S940, so that the current limit rotational speed NEs is reduced by a decremental correction value NEd as expressed by the following equation (4) at S960:

$$NEs \leftarrow NEs-NEd \quad (4)$$

The limit rotational speed NEs setting process is once terminated after the limit rotation speed setting end flag Xnes is set to ON at S970. Since the ER-ECU 40 determines NO at S930 in the subsequent limit rotational speed NEs setting process, no operation is substantially performed.

On the other hand, the ER-ECU 40 determines YES at S950 when the absolute value of acceleration becomes equal to or larger than the reference value before Xstop is set to ON. At S980, an incremental correction value NEp is added to the current engine rotational speed NE to calculate a corrected limit rotational speed NEs as expressed by the following equation (5):

$$NEs \leftarrow NE+NEp \quad (5)$$

The absolute value of acceleration equal to or larger than the reference value indicates that the current engine rotational speed NE is close to the resonant speed or identical to the resonant speed. Therefore, the incremental correction value NEp is added to the current engine rotational speed NE such that the rotation of the crankshaft 2a is stopped before the resonance of the engine 2 arises, and the corrected limit rotational speed NEs is set.

The limit rotational speed setting end flag Xnes is set to ON at S970, and then this process is once terminated. Since the ER-ECU 40 determines NO at S930 in the subsequent limit rotational speed NEs setting process, no operation is substantially performed.

In the fifth embodiment, the acceleration sensor acts as resonance detector. The ER-ECU 40 which executes steps S310–S370, S400, S420–S460 in the crankshaft rotating process (FIG. 4), and the limit rotational speed NEs setting process (FIG. 16) acts as vibration reducing means.

According to the fifth embodiment, the following advantages are provided.

(5a) The advantages set forth in (1a), (1b) and (1c) of the first embodiment are provided as well.

(5b) If the resonance arises or is about to arise in a period in which the engine rotational speed NE is being gradually reduced by the driving of the M/G 26 for stopping the engine 2, the limit rotational speed NEs is set as corrected based on the engine rotational speed NE at that time. Therefore, the limit rotational speed NEs is optimized even if the initially set limit rotational speed NEs is not appropriate for preventing the resonance or has been changed to an inappropriate one due to variations in engine mount, change in temperature, or aging changes. Consequently, the vibrations are securely prevented.

Also, when the resonance arises or is about to arise in a period in which the engine rotational speed NE is being gradually reduced by the driving of the M/G 26, the limit rotational speed NEs is corrected. The corrected limit rotational speed NEs is immediately reflected to the crankshaft rotating process (FIG. 4), so that vibrations are rapidly prevented.

(5c) When the resonance does not arise until the vibration reducing operation end flag Xstop is set to ON, it is thought that the limit rotational speed NEs is set unnecessarily high. Therefore, the limit rotational speed NEs is corrected to a lower value if no resonance arises in a period in which the engine rotational speed NE is reduced. Since this can minimally reduce the creep force, an extremely small difference in creep force will be produced even if the engine is instantly stopped from the limit rotational speed NEs, thereby making it possible to prevent the vehicle from vibrating. Thus, the driver can be more effectively prevented from suffering from discomfort.

The first through fifth embodiments may be modified in the following manner.

In the first embodiment, the timing at which the engine 2 is stopped by the driving of the M/G 26 is determined from a comparison of the brake booster pressure BBP with the reference pressure Px, and the lapse of the reference time in order to address re-treading on the brake pedal 52 immediately after the engine 2 is stopped. In place of the brake booster pressure BBP, an appropriate forced engine rotation time capable of reducing the brake booster pressure BBP to the reference pressure Px or lower may be separately found by experiment, such that the engine is stopped after the lapse of this empirical forced engine rotation time. In this event, the rotational speed decrease start flag Xdown may be set to ON at S400 after the lapse of the longer one of the forced engine rotation time required for reducing the brake booster pressure BBP and the reference time required for reducing the air pressure within the cylinder.

Alternatively, the reduction in the brake booster pressure BBP may be determined from the forced engine rotation time, while the reference time required for reducing the air pressure within the cylinder may be determined from the degree of the intake pressure within the surge tank 2c as is the case with the second embodiment.

In the first and second embodiments, the reference rotational speed for the crankshaft 2a for reducing the air pressure in the cylinder is set to the target idle rotational speed NEidl. Alternatively, the reference rotational speed may be changed to any other rotational speed as long as it can reduce the air pressure within the cylinder. Also, a plurality of reference rotational speed may be used. For example, an entire rotational speed region in a predetermined range may be used as the reference rotational speed. The air pressure within the cylinder is reduced by controlling the rotational speed of the crankshaft 2a such that the reference rotational speed falls within this rotational speed region.

In the first and second embodiments, the engine is continuously driven by the M/G 26 when the combustion of the engine is stopped, as long as there is a request for driving the power steering pump (YES at S410). Alternatively, the engine may be continuously driven for a limited time. For example, even if there is a request for driving the power steering pump, steps S420–S460 may be executed again after the lapse of the limited time. Further alternatively, the electromagnetic clutch 10a may be shut off after the lapse of the limited time. In this way, since the engine will not be left driven continuously for a long time by the M/G 26, the power consumption is saved.

In the first and second embodiments, when there is a request for driving the power steering pump upon stopping the combustion (YES at S410), the rotation of the engine is continued while maintaining the target rotational speed NEt at that time. The target rotational speed NEt may be gradually reduced even if there is a request for driving the power steering pump as long as the gradually reduced target rotational speed NEt does not hinder the generation of operating hydraulic pressure for the power steering. For example, if the operating hydraulic pressure of the power steering pump has reached a predetermined value when the engine rotational speed NE is at 400 rpm, the target rotational speed NEt may be continuously reduced even if there is a request for driving the power steering pump. Then, at the time the engine rotational speed NE reaches 400 rpm, the electromagnetic clutch 10a may be disconnected from the crankshaft 2a to drive the auxiliary machine 22 alone.

The M/G stopping process in FIG. 8 may be applied to the second embodiment. In addition, since the M/G stopping process in FIG. 8 helps suppressing vibrations, the M/G stopping process in FIG. 8 may be applied for stopping the M/G 26 which is driving the engine 2 in the processes other than the first and second embodiments.

In the third embodiment, the timing at which the engine 2 driven by the M/G 26 is shut off is set by the process in FIG. 8 for stopping the M/G 26. Other than this process, step S240 in FIG. 3 for turning off the electromagnetic clutch 10a corresponds to the operation for shutting off the engine 2 driven by the M/G 26. Therefore, the electromagnetic clutch 10a may be turned off at step S240 at the timing at which the angular acceleration of the crankshaft 2a enters in the positive region.

Figure 17:
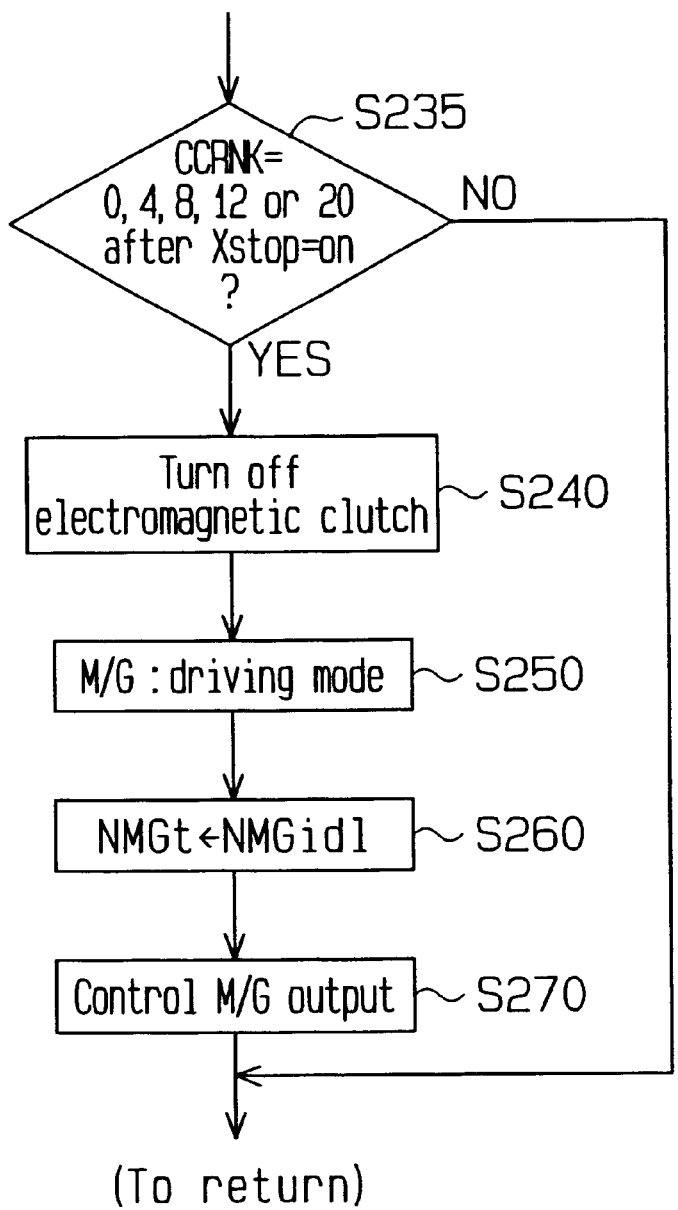
FIG. 17 is a flow chart illustrating a modification to the process in the third embodiment.

For example, the process illustrated in the flow chart of FIG. 17 may be executed in place of steps S240-S270 in the combustion stop mode M/G driving process (FIG. 3). In this way, vibrations are reduced as well when the electromagnetic clutch 10a is turned off. Specifically, when a request is made for driving the auxiliary machine 22 (YES at S230), the ER-ECU 40 determines whether or not the crank counter CCRNK reaches any of 0, 4, 8, 12, 16, 20 after Xstop is set to ON (S235). The ER-ECU 40 determines YES once the crank counter CCRNK reaches any of 0, 4, 8, 12, 16, 20 after the vibration reducing operation end flag Xstop was set to ON. Therefore, this process is once terminated if the crank counter CCRNK is not equal to any of 0, 4, 8, 12, 16, 20 after Xstop was set to ON. However, the ER-ECU 40 subsequently determines YES at step S235 if CCRNK is equal to any of 0, 4, 8, 12, 16, 20, leading to the execution of steps S240–S270 in the first embodiment.

The electromagnetic clutch 10a is first turned off at step S240 at the timing at which CCRNK reaches any of 0, 4, 8, 12, 16, 20. Thus, the engine 2 driven by the M/G 26 is shut off when the angular acceleration of the crankshaft 2a is in the positive region, and particularly, at the timing at which the maximum angular acceleration is provided. Therefore, vibrations are suppressed.

In the limit rotational speed NEs setting process (FIG. 15) in the fourth embodiment, the current limit rotational speed NEs is reduced by the correction value NEd (S780) when the vibration magnitude is less than the reference magnitude at all frequencies (NO at S770). Alternatively, the limit rotational speed NEs may not be changed even if the ER-ECU 40 determines NO at S770.

In the limit rotational speed NEs setting process (FIG. 15), the engine rotational speed corresponding to the maximum frequency fmax is increased by the correction value NEp, and set as a corrected limit rotational speed NEs (S810) when the vibration magnitude is equal to or larger than the reference magnitude at at least one frequency (YES at S770). Alternatively, the reference magnitude at step S770 may be set to a value sufficiently lower than the vibration magnitude which could give discomfort to passengers in the vehicle, and the engine rotational speed corresponding to the maximum frequency fmax may be set as the limit rotational speed NEs.

In the fifth embodiment, in the limit rotational speed NEs setting process (FIG. 16), the current limit rotational speed NEs is reduced by the correction value NEd (S960) if the rotation of the crankshaft 2a is stopped with the absolute value of the acceleration remaining less than the reference value (YES at S940). Alternatively, the limit rotational speed NEs may not be changed if the rotation of the crankshaft 2a is stopped without producing obtrusive vibrations.

In the limit rotational speed NEs setting process (FIG. 16), when the absolute value of acceleration increases to the reference value or more (YES at S950), the current engine rotational speed NE is increased by the correction value NEp, and the corrected limit rotational speed NEs is set (S980). Alternatively, the reference value at step S950 may be set at a value sufficiently lower than the value with which passengers in the vehicle feel discomfort, and the current engine rotational speed NE may be set as the limit rotational speed NEs.

The limit rotational speed NEs setting process (FIGS. 15 and 16) may be combined with the control in the second and/or third embodiments in place of the first embodiment.

The reference time, reference rotational speed, reference intake pressure, and reference rotational speed may be fixed values or may be changed in accordance with the operating condition of the engine 2 immediately before the combustion is stopped, and a current driving state of the auxiliary machine 22.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. A rotation control apparatus for controlling internal combustion engine rotating means for driving an internal combustion engine to control rotation of a rotating shaft of the internal combustion engine, wherein the internal combustion engine rotating means is connected to an auxiliary machine and is selectively connected to and disconnected from the rotating shaft via a clutch, the rotation control apparatus comprising:

vibration reducing means, which maintains a rotational speed of the internal combustion engine at a reference rotational speed to reduce an air pressure in a cylinder of the internal combustion engine when an operation of the internal combustion engine is stopped, and subsequently stops rotation of the engine to reduce vibrations of the engine, wherein the vibration reducing means operates the internal combustion engine rotating means to drive the auxiliary machine while the engine is stopped.

2. The rotation control apparatus according to claim 1, wherein the vibration reducing means maintains the rotational speed at the reference rotational speed for a reference time.

3. The rotation control apparatus according to claim 1, wherein the vibration reducing means maintains the rotational speed of the rotating shaft at the reference rotational speed until a pressure within an intake pipe, which is connected to the internal combustion engine, reaches a reference intake pressure.

21

4. The rotation control apparatus according to claim 1, the vibration reducing means gradually reduces the rotational speed of the rotating shaft from the reference rotational speed.

5. The rotation control apparatus according to claim 4, wherein the vibration reducing means stops the rotating shaft immediately before the rotational speed of the rotating shaft reaches a resonant speed.

6. The rotation control apparatus according to claim 4, wherein the vibration reducing means instantly stops the rotating shaft when the rotational speed of the rotating shaft reaches a predetermined limit rotational speed higher than the resonant speed.

7. The rotation control apparatus according to claim 1, wherein the vibration reducing means shuts off the internal combustion engine driven by the internal combustion engine rotating means in a period in which angular acceleration of rotation of the rotating shaft produced by a pressure in a combustion chamber of the internal combustion engine is positive.

8. A rotation control apparatus for controlling internal combustion engine rotating means for driving an internal combustion engine while the engine is in an inoperative state, to control rotation of a rotating shaft of the internal combustion engine, wherein the internal combustion engine rotating means is connected to an auxiliary machine and is selectively connected to and disconnected from the rotating shaft via a clutch, the control apparatus comprising:

vibration reducing means, which gradually reduces a rotational speed of the rotating shaft and stops the internal combustion engine for reducing vibrations of the internal combustion engine when an operation of the internal combustion engine is stopped, wherein the vibration reducing means operates the internal combustion engine rotating means to drive the auxiliary machine while the engine is stopped.

9. The rotation control apparatus according to claim 8, wherein the vibration reducing means stops the rotating shaft immediately before a rotational speed of the rotating shaft of the internal combustion engine reaches a resonant speed.

10. The rotation control apparatus according to claim 9, wherein the vibration reducing means shuts off the internal combustion engine driven by the internal combustion engine rotating means in a period in which an angular acceleration of rotation of the rotating shaft produced by a pressure in a combustion chamber of the internal combustion engine is positive.

11. The rotation control apparatus according to claim 8, wherein the vibration reducing means further comprises detecting means for detecting a resonant speed of the internal combustion engine, wherein the vibration reducing means stops the rotating shaft before the rotational speed of the rotating shaft is reduced to the resonant speed.

12. The rotation control apparatus according to claim 8, further comprising detecting means for detecting resonance of the internal combustion engine, wherein the vibration reducing means stops the rotating shaft before the detected resonance becomes larger than a reference value while the rotating speed of the internal combustion engine is being reduced.

13. The rotation control apparatus according to claim 8, wherein the vibration reducing means instantly stops the rotating shaft when the rotational speed of the rotating shaft reaches a predetermined limit rotational speed higher than the resonant speed.

14. A rotation control apparatus for controlling internal combustion engine rotating means for rotating a rotating shaft of an internal combustion engine while the engine is in an inoperative state, to control the rotation of the rotating shaft, wherein the internal combustion engine rotating means is connected to an auxiliary machine and is selectively connected to and disconnected from the rotating shaft via a clutch, the control apparatus comprising:

vibration reducing means, which stops the rotating shaft before a rotational speed of the rotating shaft reaches a resonant speed for reducing vibrations of the internal combustion engine when an operation of the internal combustion engine is stopped, wherein the vibration reducing means operates the internal combustion engine rotating means to drive the auxiliary machine while the engine is stopped.

15. The rotation control apparatus according to claim 14, further comprising detecting means for detecting a resonant speed of the internal combustion engine, wherein the vibration reducing means stops the rotating shaft before the rotational speed of the rotating shaft is reduced to the resonant speed.

16. The rotation control apparatus according to claim 15, wherein the rotation control apparatus extracts resonant frequencies from vibrations produced when the operation of the internal combustion engine is stopped to determine the resonant speed based on the resonant frequencies.

17. The rotation control apparatus according to claim 14, further comprising detecting means for detecting resonance of the internal combustion engine, wherein the vibration reducing means stops the rotating shaft before the detected resonance becomes larger than a reference value while the rotational speed of the rotating shaft of the internal combustion engine is being reduced.

18. The rotation control apparatus according to claim 14, wherein the vibration reducing means shuts off the internal combustion engine driven by the internal combustion engine rotating means in a period in which an angular acceleration of rotation of the rotating shaft produced by a pressure in a combustion chamber of the internal combustion engine is positive.

19. The rotation control apparatus according to claim 18, wherein the vibration reducing means shuts off the internal combustion engine driven by the internal combustion engine rotating means when the angular acceleration of rotation of the rotating shaft produced by a pressure in a combustion chamber of the internal combustion engine is positive and at the time the angular acceleration of rotation is substantially maximal.

20. A rotation control apparatus for controlling internal combustion engine rotating means for rotating a rotating shaft of an internal combustion engine while the engine is in an inoperative state, to control the rotation of the rotating shaft, the control apparatus comprising:

vibration reducing controlling means, which stops the rotating shaft before a rotational speed of the rotating shaft reaches a resonant speed for reducing vibrations of the internal combustion engine when an operation of the internal combustion engine is stopped, wherein the vibration reducing means shuts off the internal combustion engine driven by the internal combustion engine rotating means when the angular acceleration of rotation of the rotating shaft produced by a pressure in a combustion chamber of the internal combustion engine is positive and when a piston of the internal combustion engine is positioned substantially at a compression top dead center.

21. A rotation control apparatus for controlling internal combustion engine rotating means for rotating a rotating shaft of an internal combustion engine while the engine is in an inoperative state, to control the rotation of the rotating shaft of the internal combustion engine, wherein the internal combustion engine rotating means is connected to an auxiliary machine and is selectively connected to and disconnected from the rotating shaft via a clutch, the control apparatus comprising:

vibration reducing means, which shuts off the internal combustion engine driven by the internal combustion engine rotating means in a period in which an angular acceleration of rotation of the rotating shaft produced by a pressure in a combustion chamber of the internal combustion engine is positive to reduce vibrations of the internal combustion engine, wherein the vibration reducing means operates the internal combustion engine rotating means to drive the auxiliary machine while the engine is stopped.

22. The rotation control apparatus according to claim 21, wherein the vibration reducing means shuts off the internal combustion engine driven by the internal combustion engine rotating means in a period in which the angular acceleration of rotation of the rotating shaft produced by the pressure in the combustion chamber of the internal combustion engine is positive.

23. A rotation control apparatus for controlling internal combustion engine rotating means for rotating a rotating shaft of an internal combustion engine while the engine is in an inoperative state, to control the rotation of the rotating shaft of the internal combustion engine, the control apparatus comprising:

vibration reducing means, which shuts off the internal combustion engine driven by the internal combustion engine rotating means in a period in which an angular acceleration of rotation of the rotating shaft produced by a pressure in a combustion chamber of the internal combustion engine is positive and when a piston of the internal combustion engine is positioned substantially at a compression top dead center.

24. A rotation control apparatus for controlling internal combustion engine rotating means for rotating a rotating shaft of an internal combustion engine to control the rotation of the rotating shaft, wherein the internal combustion engine rotating means is connected to an auxiliary machine and is selectively connected to and disconnected from the rotating shaft via a clutch, the control apparatus comprising:

vibration reducing means, which controls the internal combustion engine rotating means to maintain a rotational speed of the rotating shaft at a reference rotational speed for reducing an air pressure in a cylinder of the internal combustion engine, and subsequently stops the rotation of the rotating shaft by the internal combustion engine rotating means to reduce vibrations of the internal combustion engine when combustion of the internal combustion engine is stopped and the rotating shaft is being rotated, wherein the vibration reducing means operates the internal combustion engine rotating means to drive the auxiliary machine while the engine is stopped.

25. A rotation control apparatus for controlling a motor generator for driving an internal combustion engine to control rotation of a rotating shaft of the internal combustion engine, wherein the motor generator is connected to an auxiliary machine and is selectively connected to and disconnected from the rotating shaft via a clutch, the rotation control apparatus comprising:

a vibration reducing controller, which maintains a rotational speed of the rotating shaft at a reference rotational speed to reduce an air pressure in a cylinder of the internal combustion engine when an operation of the internal combustion engine is stopped, and subsequently stops rotation of the rotating shaft to reduce vibrations of the engine, wherein the vibration reducing controller operates the motor generator to drive the auxiliary machine while the engine is stopped.

26. A rotation control apparatus for controlling internal combustion engine rotating means for driving an internal combustion engine to control rotation of a rotating shaft of the internal combustion engine, the internal is combustion engine rotating means being connected to an auxiliary machine, the rotation control apparatus comprising:

vibration reducing means, which maintains a rotational speed of the rotating shaft at a reference rotational speed to reduce an air pressure in a cylinder of the internal combustion engine when an operation of the internal combustion engine is stopped, and subsequently stops rotation of the rotating shaft to reduce vibrations of the engine, wherein the vibration reducing means restricts the operation of the auxiliary machine when controlling the rotation of the rotating shaft.

27. A rotation control apparatus for controlling a motor generator for driving an internal combustion engine to control rotation of a rotating shaft of the internal combustion engine, the motor generator being connected to an auxiliary machine, the rotation control apparatus comprising:

a vibration reducing controller, which maintains a rotational speed of the rotating shaft at a reference rotational speed to reduce an air pressure in a cylinder of the internal combustion engine when an operation of the internal combustion engine is stopped, and subsequently stops rotation of the rotating shaft to reduce vibrations of the engine, wherein vibration reducing controller restricts the operation of the auxiliary machine when controlling the rotation of the rotating shaft.

28. A rotation control apparatus for controlling a motor generator for driving an internal combustion engine while the engine is in an inoperative state, to control rotation of a rotating shaft of the internal combustion engine, wherein the motor generator is connected to an auxiliary machine and is selectively connected and disconnected to the rotating shaft via a clutch, the control apparatus comprising:

a vibration reducing controller, which gradually reduces a rotational speed of the rotating shaft and stops the internal combustion engine for reducing vibrations of the internal combustion engine when an operation of the internal combustion engine is stopped, wherein the vibration reducing controller operates the motor generator to drive the auxiliary machine while the engine is stopped.

29. A rotation control apparatus for controlling internal combustion engine rotating means for driving an internal combustion engine while the engine is in an inoperative state, to control rotation of a rotating shaft of the internal combustion engine, the internal combustion engine rotating means being connected to an auxiliary machine, the control apparatus comprising:

vibration reducing means, which gradually reduces a rotational speed of the internal combustion engine and stops the internal combustion engine for reducing vibrations of the internal combustion engine when an operation of the internal combustion engine is stopped, wherein the vibration reducing means restricts the operation of the auxiliary machine when controlling the rotation of the rotating shaft.

30. A rotation control apparatus for controlling a motor generator for driving an internal combustion engine while the engine is in an inoperative state, to control rotation of a rotating shaft of the internal combustion engine, the motor generator being connected to an auxiliary machine, the control apparatus comprising:
 a vibration reducing controller, which gradually reduces a rotational speed of the rotating shaft and stops the internal combustion engine for reducing vibrations of the internal combustion engine when an operation of the internal combustion engine is stopped, wherein the vibration reducing controller restricts the operation of the auxiliary machine when controlling the rotation of the rotating shaft.

31. A rotation control apparatus for controlling a motor generator for rotating a rotating shaft of an internal combustion engine while the engine is in an inoperative state, to control the rotation of the rotating shaft, wherein the motor generator is connected to an auxiliary machine and is selectively connected to and disconnected from the rotating shaft via a clutch, the control apparatus comprising:
 a vibration reducing controller, which stops the rotating shaft before a rotational speed of the rotating shaft reaches a resonant speed for reducing vibrations of the internal combustion engine when an operation of the internal combustion engine is stopped, wherein the vibration reducing controller operates the motor generator to drive the auxiliary machine while the engine is stopped.

32. A rotation control apparatus for controlling internal combustion engine rotating means for rotating a rotating shaft of an internal combustion engine while the engine is in an inoperative state, to control the rotation of the rotating shaft, the internal combustion engine rotating means being connected to an auxiliary machine, the control apparatus comprising:
 vibration reducing means, which stops the rotating shaft before a rotational speed of the rotating shaft reaches a resonant speed for reducing vibrations of the internal combustion engine when an operation of the internal combustion engine is stopped, wherein the vibration reducing means restricts the operation of the auxiliary machine when controlling the rotation of the rotating shaft.

33. A rotation control apparatus for controlling internal combustion engine rotating means for rotating a rotating shaft of an internal combustion engine while the engine is in an inoperative state, to control the rotation of the rotating shaft, the motor generator being connected to an auxiliary machine, the control apparatus comprising:
 a vibration reducing controller, which stops the rotating shaft before a rotational speed of the rotating shaft reaches a resonant speed for reducing vibrations of the internal combustion engine when an operation of the internal combustion engine is stopped, wherein the vibration reducing controller restricts the operation of the auxiliary machine when controlling the rotation of the rotating shaft.

34. A rotation control apparatus for controlling a motor generator for rotating a rotating shaft of an internal combustion engine while the engine is in an inoperative state, to control the rotation of the rotating shaft of the internal combustion engine, wherein the motor generator is connected to an auxiliary machine and is selectively connected to and disconnected from the rotating shaft via a clutch, the control apparatus comprising:
 a vibration reducing controller, which shuts off the internal combustion engine driven by the motor generator in a period in which an angular acceleration of rotation of the rotating shaft produced by a pressure in a combustion chamber of the internal combustion engine is positive, wherein the vibration reducing controller operates the motor generator to drive the auxiliary machine while the engine is stopped.

35. A rotation control apparatus for controlling internal combustion engine rotating means for rotating a rotating shaft of an internal combustion engine while the engine is in an inoperative state, to control the rotation of the rotating shaft of the internal combustion engine, the internal combustion engine rotating means being connected to an auxiliary machine, the control apparatus comprising:
 vibration reducing means, which shuts off the internal combustion engine driven by the internal combustion engine rotating means in a period in which an angular acceleration of rotation of the rotating shaft produced by a pressure in a combustion chamber of the internal combustion engine is positive, wherein the vibration reducing means restricts the operation of the auxiliary machine when controlling the rotation of the rotating shaft.

36. A rotation control apparatus for controlling a motor generator for rotating a rotating shaft of an internal combustion engine while the engine is in an inoperative state, to control the rotation of the rotating shaft of the internal combustion engine, the motor generator being connected to an auxiliary machine, the control apparatus comprising:
 a vibration reducing controller, which shuts off the internal combustion engine driven by the motor generator in a period in which an angular acceleration of rotation of the rotating shaft produced by a pressure in a combustion chamber of the internal combustion engine is positive, wherein the vibration reducing controller restricts the operation of the auxiliary machine when controlling the rotation of the rotating shaft.

37. A rotation control apparatus for controlling a motor generator for rotating a rotating shaft of an internal combustion engine to control the rotation of the rotating shaft, wherein the motor generator is connected to an auxiliary machine and is selectively connected to and disconnected from the rotating shaft via a clutch, the control apparatus comprising:
 a vibration reducing controller, which controls the motor generator to maintain a rotational speed of the rotating shaft at a reference rotational speed for reducing an air pressure in a cylinder of the internal combustion engine, and subsequently stops the rotation of the rotating shaft by the motor generator to reduce vibrations of the internal combustion engine when combustion of the internal combustion engine is stopped and the rotating shaft is being rotated, wherein the vibration reducing controller operates the motor generator to drive the auxiliary machine while the engine is stopped.

38. A rotation control apparatus for controlling internal combustion engine rotating means for rotating a rotating shaft of an internal combustion engine to control the rotation of the rotating shaft, the internal combustion engine rotating means being connected to an auxiliary machine, the control apparatus comprising:
 vibration reducing means, which controls the internal combustion engine rotating means to maintain a rotational speed of the rotating shaft at a reference rotational speed for reducing an air pressure in a cylinder of the internal combustion engine, and subsequently stops the rotation of the rotating shaft by the internal combustion engine rotating means to reduce vibrations of the internal combustion engine when combustion of the internal combustion engine is stopped and the rotating shaft is being rotated, wherein the vibration reducing means restricts the operation of the auxiliary machine when controlling the rotation of the rotating shaft.

39. A rotation control apparatus for controlling a motor generator for rotating a rotating shaft of an internal combustion engine to control the rotation of the rotating shaft, the motor generator being connected to an auxiliary machine, the control apparatus comprising:

a vibration reducing controller, which controls the motor generator to maintain a rotational speed of the rotating shaft at a reference rotational speed for reducing an air pressure in a cylinder of the internal combustion engine, and subsequently stops the rotation of the rotating shaft by the motor generator to reduce vibrations of the internal combustion engine when combustion of the internal combustion engine is stopped and the rotating shaft is being rotated, wherein the vibration reducing controller restricts the operation of the auxiliary machine when controlling the rotation of the rotating shaft.

40. A rotation control apparatus for controlling a motor generator for rotating a rotating shaft of an internal combustion engine while the engine is in an inoperative state, to control the rotation of the rotating shaft, the control apparatus comprising:

a vibration reducing controller, which stops the rotating shaft before a rotational speed of the rotating shaft reaches a resonant speed for reducing vibrations of the internal combustion engine when an operation of the internal combustion engine is stopped, wherein the vibration reducing means shuts off the internal combustion engine driven by the internal combustion engine rotating means when the angular acceleration of rotation of the rotating shaft produced by a pressure in a combustion chamber of the internal combustion engine is positive and when a piston of the internal combustion engine is positioned substantially at a compression top dead center.

41. A method for controlling internal combustion engine rotating means for rotating a rotating shaft of an internal combustion engine while the engine is in an inoperative state, to control the rotation of the rotating shaft, the method comprising:

stopping the rotating shaft before a rotational speed of the rotating shaft reaches a resonant speed for reducing vibrations of the internal combustion engine when an operation of the internal combustion engine is stopped, to reduce vibration of the engine, wherein the step of stopping the rotating shaft includes shutting off the internal combustion engine driven by the internal combustion engine rotating means when the angular acceleration of rotation of the rotating shaft produced by a pressure in a combustion chamber of the internal combustion engine is positive and when a piston of the internal combustion engine is positioned substantially at a compression top dead center.

42. A rotation control apparatus for controlling a motor generator for rotating a rotating shaft of an internal combustion engine while the engine is in an inoperative state, to control the rotation of the rotating shaft of the internal combustion engine, the control apparatus comprising:

a vibration reducing controller, which shuts off the internal combustion engine driven by the motor generator in a period in which an angular acceleration of rotation of the rotating shaft produced by a pressure in a combustion chamber of the internal combustion engine is positive and when a piston of the internal combustion engine is positioned substantially at a compression top dead center.

43. A method for controlling internal combustion engine rotating means for rotating a rotating shaft of an internal combustion engine while the engine is in an inoperative state, to control the rotation of the rotating shaft of the internal combustion engine, the method comprising:

shutting off the internal combustion engine driven by the internal combustion engine rotating means in a period in which an angular acceleration of rotation of the rotating shaft produced by a pressure in a combustion chamber of the internal combustion engine is positive and when a piston of the internal combustion engine is positioned substantially at a compression top dead center to reduce vibrations of the internal combustion engine.

* * * * *